(12) United States Patent
Liu et al.

(10) Patent No.: US 9,772,406 B2
(45) Date of Patent: Sep. 26, 2017

(54) ESTIMATING AND PREDICTING STRUCTURES PROXIMATE TO A MOBILE DEVICE

(75) Inventors: Jie Liu, Medina, WA (US); Lin Zhong, Houston, TX (US); David Chu, Bellevue, WA (US); Gursharan Sidhu, Seattle, WA (US); Nissanka Arachchige Bodhi Priyantha, Redmond, WA (US); Sharad Agarwal, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1085 days.

(21) Appl. No.: 13/606,029

(22) Filed: Sep. 7, 2012

(65) Prior Publication Data
US 2014/0070991 A1 Mar. 13, 2014

(51) Int. Cl.
G01S 19/22 (2010.01)
G01S 19/42 (2010.01)
G01S 19/34 (2010.01)

(52) U.S. Cl.
CPC ............ *G01S 19/22* (2013.01); *G01S 19/428* (2013.01); *G01S 19/34* (2013.01)

(58) Field of Classification Search
CPC ............................... G01S 19/428; G01S 19/34
See application file for complete search history.

(56) References Cited

U.S. PATENT DOCUMENTS

| | | | |
|---|---|---|---|
| 4,357,593 A | 11/1982 | von Tomkewitsch | |
| 4,796,191 A | 1/1989 | Honey et al. | |
| 4,949,268 A * | 8/1990 | Nishikawa et al. | ......... 701/454 |
| 5,394,333 A | 2/1995 | Kao | |
| 5,493,692 A | 2/1996 | Theimer et al. | |
| 5,544,321 A | 8/1996 | Theimer et al. | |
| 5,555,376 A | 9/1996 | Theimer et al. | |
| 5,564,079 A | 10/1996 | Olsson | |
| 5,592,173 A * | 1/1997 | Lau et al. | ............... 342/357.74 |
| 5,603,054 A | 2/1997 | Theimer et al. | |
| 5,611,050 A | 3/1997 | Theimer et al. | |
| 5,629,855 A | 5/1997 | Kyrtsos et al. | |
| 5,812,865 A | 9/1998 | Theimer et al. | |
| 5,842,130 A | 11/1998 | Oprescu-Surcobe et al. | |
| 5,883,598 A | 3/1999 | Parl et al. | |
| 5,943,621 A | 8/1999 | Ho et al. | |

(Continued)

FOREIGN PATENT DOCUMENTS

| | | |
|---|---|---|
| CN | 1375999 A | 10/2002 |
| CN | 1488955 A | 4/2004 |

(Continued)

OTHER PUBLICATIONS

Groves, Paul D. "Shadow Matching: A New GNSS Positioning Technique for Urban Canyons." The JOurnal of Navigation 2011, 64, pp. 417-430.*

(Continued)

*Primary Examiner* — Gregory C Issing
(74) *Attorney, Agent, or Firm* — Rainier Patents, P.S.

(57) ABSTRACT

The description relates to mobile device location. One example can identify global navigation satellite system (GNSS) satellites expected to be in line-of-sight of a mobile device. This example can detect differences between received GNSS data signals and expected GNSS data signals from the expected GNSS satellites. The example can also determine a direction from the mobile device of an obstruction that is causing at least some of the detected differences.

20 Claims, 7 Drawing Sheets

(56) References Cited

U.S. PATENT DOCUMENTS

| | | | |
|---|---|---|---|
| 5,948,040 | A | 9/1999 | DeLorme et al. |
| 5,978,732 | A | 11/1999 | Kakitani et al. |
| 6,052,598 | A | 4/2000 | Rudrapatna et al. |
| 6,122,572 | A | 9/2000 | Yavnai |
| 6,175,805 | B1 | 1/2001 | Abe |
| 6,292,687 | B1 | 9/2001 | Lowell et al. |
| 6,313,786 | B1 * | 11/2001 | Sheynblat et al. ........ 342/357.23 |
| 6,323,807 | B1 | 11/2001 | Golding et al. |
| 6,353,398 | B1 | 3/2002 | Amin et al. |
| 6,418,424 | B1 | 7/2002 | Hoffberg et al. |
| 6,466,232 | B1 | 10/2002 | Newell et al. |
| 6,480,783 | B1 | 11/2002 | Myr |
| 6,513,046 | B1 | 1/2003 | Abbott, III et al. |
| 6,522,266 | B1 | 2/2003 | Soehren et al. |
| 6,549,915 | B2 | 4/2003 | Abbott, III et al. |
| 6,556,832 | B1 | 4/2003 | Soliman |
| 6,564,149 | B2 | 5/2003 | Lai |
| 6,574,351 | B1 | 6/2003 | Miyano |
| 6,577,946 | B2 | 6/2003 | Myr |
| 6,615,130 | B2 | 9/2003 | Myr |
| 6,672,506 | B2 | 1/2004 | Swart et al. |
| 6,678,525 | B1 | 1/2004 | Baranger et al. |
| 6,721,572 | B1 | 4/2004 | Smith et al. |
| 6,741,188 | B1 | 5/2004 | Miller et al. |
| 6,747,675 | B1 | 6/2004 | Abbott et al. |
| D494,584 | S | 8/2004 | Schlieffers et al. |
| 6,791,580 | B1 | 9/2004 | Abbott et al. |
| 6,796,505 | B2 | 9/2004 | Pellaumail et al. |
| 6,799,047 | B1 | 9/2004 | Bahl et al. |
| 6,801,223 | B1 | 10/2004 | Abbott et al. |
| 6,810,325 | B2 | 10/2004 | Amano et al. |
| 6,812,937 | B1 | 11/2004 | Abbott et al. |
| 6,837,436 | B2 | 1/2005 | Swartz et al. |
| 6,842,877 | B2 | 1/2005 | Robarts et al. |
| 6,889,382 | B1 | 5/2005 | Anderson |
| 6,925,378 | B2 | 8/2005 | Tzamaloukas |
| 6,992,625 | B1 | 1/2006 | Krumm et al. |
| 7,010,501 | B1 | 3/2006 | Roslak et al. |
| 7,040,541 | B2 | 5/2006 | Swartz et al. |
| 7,054,938 | B2 | 5/2006 | Sundqvist et al. |
| 7,063,263 | B2 | 6/2006 | Swartz et al. |
| 7,084,762 | B2 | 8/2006 | Pedrazzini et al. |
| 7,096,030 | B2 | 8/2006 | Huomo |
| 7,116,987 | B2 | 10/2006 | Spain et al. |
| 7,116,988 | B2 | 10/2006 | Dietrich et al. |
| 7,127,213 | B2 * | 10/2006 | Haymes ............. G01C 21/3461 342/357.31 |
| 7,161,914 | B2 | 1/2007 | Shoaib et al. |
| 7,162,367 | B2 | 1/2007 | Lin et al. |
| 7,171,378 | B2 | 1/2007 | Petrovich et al. |
| 7,195,157 | B2 | 3/2007 | Swartz et al. |
| 7,215,969 | B2 | 5/2007 | Benco et al. |
| 7,233,861 | B2 | 6/2007 | Van Buer et al. |
| 7,250,907 | B2 | 7/2007 | Krumm et al. |
| 7,299,059 | B2 | 11/2007 | Misikangas et al. |
| 7,321,774 | B1 | 1/2008 | Lau et al. |
| 7,349,683 | B2 | 3/2008 | Misikangas et al. |
| 7,359,713 | B1 | 4/2008 | Tiwari |
| 7,385,501 | B2 | 6/2008 | Miller et al. |
| 7,392,134 | B2 | 6/2008 | Tauchi et al. |
| 7,433,696 | B2 | 10/2008 | Dietrich et al. |
| 7,512,462 | B2 | 3/2009 | Nichols et al. |
| 7,590,589 | B2 | 9/2009 | Hoffberg |
| 7,617,042 | B2 | 11/2009 | Horvitz et al. |
| 7,630,986 | B1 | 12/2009 | Herz et al. |
| 7,705,728 | B2 | 4/2010 | Mock et al. |
| 7,778,440 | B2 | 8/2010 | Malone |
| 7,796,944 | B2 | 9/2010 | Eaton et al. |
| 7,796,966 | B2 | 9/2010 | Bhattacharya et al. |
| 7,813,870 | B2 | 10/2010 | Downs et al. |
| 7,835,863 | B2 | 11/2010 | Lokshin |
| 7,840,340 | B2 | 11/2010 | Graham et al. |
| 7,856,234 | B2 | 12/2010 | Alizadeh-Shabdiz et al. |
| 7,864,048 | B1 | 1/2011 | Cope et al. |
| 7,873,368 | B2 | 1/2011 | Goren |
| 7,899,611 | B2 | 3/2011 | Downs et al. |
| 7,912,628 | B2 | 3/2011 | Chapman et al. |
| 7,961,651 | B2 | 6/2011 | Kim et al. |
| 8,155,872 | B2 | 4/2012 | Kjeldsen et al. |
| 8,174,447 | B2 | 5/2012 | Loidl et al. |
| 8,180,366 | B2 | 5/2012 | Ernst et al. |
| 8,244,272 | B2 | 8/2012 | Morgan et al. |
| 8,255,275 | B2 | 8/2012 | Collopy et al. |
| 8,260,481 | B2 | 9/2012 | Naik et al. |
| 8,311,730 | B2 | 11/2012 | Neff |
| 8,320,939 | B1 | 11/2012 | Vincent |
| 8,433,512 | B1 | 4/2013 | Lopatenko et al. |
| 8,443,662 | B2 | 5/2013 | Lane et al. |
| 8,463,545 | B2 | 6/2013 | Boore et al. |
| 8,484,113 | B2 | 7/2013 | Collopy et al. |
| 8,519,860 | B2 | 8/2013 | Johnson et al. |
| 8,532,670 | B2 | 9/2013 | Kim et al. |
| 8,538,686 | B2 | 9/2013 | Gruen et al. |
| 8,560,218 | B1 | 10/2013 | Kahn et al. |
| 8,566,029 | B1 | 10/2013 | Lopatenko et al. |
| 8,589,065 | B2 | 11/2013 | Scofield et al. |
| 8,620,692 | B2 | 12/2013 | Collopy et al. |
| 8,712,931 | B1 | 4/2014 | Wahlen |
| 8,751,146 | B2 | 6/2014 | Shrivathsan et al. |
| 8,762,053 | B1 | 6/2014 | Lehman |
| 8,788,606 | B2 | 7/2014 | Johnson et al. |
| 8,825,381 | B2 | 9/2014 | Tang |
| 8,898,002 | B2 | 11/2014 | Barrett |
| 8,981,995 | B2 | 3/2015 | Schlesinger et al. |
| 8,990,333 | B2 | 3/2015 | Johnson et al. |
| 9,134,137 | B2 | 9/2015 | Brush et al. |
| 9,310,462 | B2 | 4/2016 | Chintalapudi et al. |
| 2001/0029425 | A1 | 10/2001 | Myr |
| 2001/0030664 | A1 | 10/2001 | Shulman et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0050944 | A1 | 5/2002 | Sheynblat et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0140088 | A1 | 7/2003 | Robinson et al. |
| 2003/0154476 | A1 | 8/2003 | Abbott, III et al. |
| 2003/0229471 | A1 | 12/2003 | Guralnik et al. |
| 2003/0229895 | A1 | 12/2003 | Jasinschi et al. |
| 2004/0019603 | A1 | 1/2004 | Haigh et al. |
| 2004/0068364 | A1 | 4/2004 | Zhao et al. |
| 2004/0153445 | A1 | 8/2004 | Horvitz et al. |
| 2004/0167667 | A1 | 8/2004 | Goncalves et al. |
| 2004/0189475 | A1 | 9/2004 | Cooper et al. |
| 2004/0201500 | A1 | 10/2004 | Miller et al. |
| 2004/0230374 | A1 | 11/2004 | Tzamaloukas |
| 2004/0266457 | A1 | 12/2004 | Dupray |
| 2004/0268403 | A1 | 12/2004 | Krieger et al. |
| 2005/0021417 | A1 | 1/2005 | Kassan |
| 2005/0034078 | A1 | 2/2005 | Abbott et al. |
| 2005/0037775 | A1 | 2/2005 | Moeglein et al. |
| 2005/0048946 | A1 | 3/2005 | Holland |
| 2005/0062643 | A1 | 3/2005 | Pande et al. |
| 2005/0107946 | A1 | 5/2005 | Shimizu et al. |
| 2005/0144318 | A1 | 6/2005 | Chang |
| 2005/0219120 | A1 | 10/2005 | Chang |
| 2005/0228553 | A1 | 10/2005 | Tryon |
| 2005/0261004 | A1 | 11/2005 | Dietrich et al. |
| 2005/0266858 | A1 | 12/2005 | Miller et al. |
| 2005/0272442 | A1 | 12/2005 | Miller et al. |
| 2005/0285793 | A1 | 12/2005 | Sugar et al. |

(56) References Cited

U.S. PATENT DOCUMENTS

| | | |
|---|---|---|
| 2006/0019676 A1 | 1/2006 | Miller et al. |
| 2006/0052115 A1 | 3/2006 | Khushu |
| 2006/0167784 A1 | 7/2006 | Hoffberg |
| 2006/0200310 A1 | 9/2006 | Kim et al. |
| 2006/0241862 A1 | 10/2006 | Ichihara et al. |
| 2006/0256005 A1 | 11/2006 | Thandu et al. |
| 2006/0264211 A1 | 11/2006 | Kalhan |
| 2006/0284765 A1* | 12/2006 | Bernhardt et al. ....... 342/357.09 |
| 2006/0287813 A1 | 12/2006 | Quigley |
| 2007/0073477 A1 | 3/2007 | Krumm et al. |
| 2007/0091037 A1 | 4/2007 | Lee |
| 2007/0115174 A1 | 5/2007 | Herrick |
| 2007/0179792 A1 | 8/2007 | Kramer |
| 2007/0208495 A1 | 9/2007 | Chapman et al. |
| 2007/0225937 A1 | 9/2007 | Spiesberger |
| 2007/0287473 A1 | 12/2007 | Dupray |
| 2008/0005172 A1 | 1/2008 | Gutmann |
| 2008/0018529 A1 | 1/2008 | Yoshioka |
| 2008/0077326 A1 | 3/2008 | Funk et al. |
| 2008/0090591 A1 | 4/2008 | Miller et al. |
| 2008/0091537 A1 | 4/2008 | Miller et al. |
| 2008/0129598 A1* | 6/2008 | Godefroy et al. ............ 342/450 |
| 2008/0161018 A1 | 7/2008 | Miller et al. |
| 2008/0180637 A1 | 7/2008 | Kjeldsen et al. |
| 2008/0191941 A1 | 8/2008 | Saban et al. |
| 2008/0234935 A1 | 9/2008 | Wolf et al. |
| 2008/0249667 A1 | 10/2008 | Horvitz et al. |
| 2008/0262728 A1 | 10/2008 | Lokshin et al. |
| 2008/0305808 A1 | 12/2008 | Chan et al. |
| 2009/0005061 A1 | 1/2009 | Ward et al. |
| 2009/0005975 A1 | 1/2009 | Forstall et al. |
| 2009/0009397 A1 | 1/2009 | Taylor et al. |
| 2009/0043504 A1 | 2/2009 | Bandyopadhyay et al. |
| 2009/0051566 A1 | 2/2009 | Olsen et al. |
| 2009/0063038 A1 | 3/2009 | Shrivathsan et al. |
| 2009/0149155 A1 | 6/2009 | Grossman |
| 2009/0177437 A1 | 7/2009 | Roumeliotis |
| 2009/0184849 A1 | 7/2009 | Nasiri et al. |
| 2009/0191892 A1 | 7/2009 | Kelley |
| 2009/0192709 A1 | 7/2009 | Yonker et al. |
| 2009/0201896 A1 | 8/2009 | Davis et al. |
| 2009/0248301 A1 | 10/2009 | Judd et al. |
| 2009/0312032 A1 | 12/2009 | Bornstein et al. |
| 2010/0010733 A1 | 1/2010 | Krumm et al. |
| 2010/0039929 A1 | 2/2010 | Cho et al. |
| 2010/0079332 A1* | 4/2010 | Garin ................. G01S 19/08 342/357.64 |
| 2010/0079334 A1 | 4/2010 | Roh et al. |
| 2010/0087230 A1 | 4/2010 | Peh et al. |
| 2010/0090899 A1 | 4/2010 | Zhao et al. |
| 2010/0097269 A1 | 4/2010 | Loidl et al. |
| 2010/0106603 A1 | 4/2010 | Dey et al. |
| 2010/0127926 A1 | 5/2010 | Wang |
| 2010/0131308 A1 | 5/2010 | Collopy et al. |
| 2010/0156708 A1 | 6/2010 | Chen |
| 2010/0161179 A1 | 6/2010 | McClure et al. |
| 2010/0174479 A1 | 7/2010 | Golding et al. |
| 2010/0176992 A1* | 7/2010 | T'siobbel ................. 342/357.25 |
| 2010/0250133 A1 | 9/2010 | Buros |
| 2010/0250727 A1 | 9/2010 | King et al. |
| 2010/0255856 A1 | 10/2010 | Kansal et al. |
| 2010/0255858 A1 | 10/2010 | Juhasz |
| 2010/0310071 A1 | 12/2010 | Malone et al. |
| 2010/0324813 A1 | 12/2010 | Sundararajan et al. |
| 2010/0324815 A1 | 12/2010 | Hiruta et al. |
| 2010/0332125 A1 | 12/2010 | Tan et al. |
| 2011/0035142 A1 | 2/2011 | Tang |
| 2011/0039573 A1 | 2/2011 | Hardie |
| 2011/0050493 A1 | 3/2011 | Tormoto et al. |
| 2011/0071759 A1 | 3/2011 | Pande et al. |
| 2011/0148623 A1 | 6/2011 | Bishop et al. |
| 2011/0151898 A1 | 6/2011 | Chandra et al. |
| 2011/0163914 A1 | 7/2011 | Seymour |
| 2011/0169632 A1 | 7/2011 | Walker et al. |
| 2011/0178708 A1 | 7/2011 | Zhang et al. |
| 2011/0182238 A1 | 7/2011 | Marshall et al. |
| 2011/0184644 A1 | 7/2011 | McBurney |
| 2011/0191024 A1 | 8/2011 | DeLuca |
| 2011/0191052 A1 | 8/2011 | Lin et al. |
| 2011/0197200 A1 | 8/2011 | Huang et al. |
| 2011/0207471 A1 | 8/2011 | Murray et al. |
| 2011/0208430 A1 | 8/2011 | Tun et al. |
| 2011/0212732 A1 | 9/2011 | Garrett et al. |
| 2011/0238308 A1 | 9/2011 | Miller et al. |
| 2011/0270940 A1 | 11/2011 | Johnson et al. |
| 2011/0282571 A1 | 11/2011 | Krumm et al. |
| 2011/0291886 A1 | 12/2011 | Krieter |
| 2011/0306323 A1 | 12/2011 | Do et al. |
| 2012/0052873 A1 | 3/2012 | Wong |
| 2012/0121161 A1 | 5/2012 | Eade et al. |
| 2012/0129546 A1 | 5/2012 | Yang et al. |
| 2012/0143495 A1 | 6/2012 | Dantu |
| 2012/0173139 A1 | 7/2012 | Judd et al. |
| 2012/0176491 A1 | 7/2012 | Garin et al. |
| 2012/0188124 A1* | 7/2012 | Reidevall et al. ....... 342/357.67 |
| 2012/0203453 A1 | 8/2012 | Lundquist et al. |
| 2012/0209507 A1 | 8/2012 | Serbanescu |
| 2012/0218142 A1 | 8/2012 | Leclercq |
| 2012/0221244 A1 | 8/2012 | Georgy et al. |
| 2012/0238293 A9 | 9/2012 | Pan et al. |
| 2012/0259541 A1 | 10/2012 | Downey et al. |
| 2012/0259666 A1 | 10/2012 | Collopy et al. |
| 2012/0290615 A1 | 11/2012 | Lamb et al. |
| 2012/0299724 A1 | 11/2012 | Kuper et al. |
| 2013/0002857 A1 | 1/2013 | Kulik |
| 2013/0018581 A1 | 1/2013 | Sidhu et al. |
| 2013/0018629 A1 | 1/2013 | Sidhu et al. |
| 2013/0030690 A1 | 1/2013 | Witmer |
| 2013/0035111 A1 | 2/2013 | Moeglein et al. |
| 2013/0095848 A1 | 4/2013 | Gold et al. |
| 2013/0110454 A1 | 5/2013 | Sidhu et al. |
| 2013/0115971 A1 | 5/2013 | Marti et al. |
| 2013/0116921 A1 | 5/2013 | Kasargod et al. |
| 2013/0138314 A1 | 5/2013 | Viittala et al. |
| 2013/0158867 A1 | 6/2013 | Sidhu et al. |
| 2013/0211711 A1* | 8/2013 | Kelly et al. ................... 701/445 |
| 2013/0285849 A1* | 10/2013 | Ben-Moshe ........... G01C 21/20 342/357.23 |
| 2013/0297204 A1 | 11/2013 | Bartels |
| 2013/0332064 A1 | 12/2013 | Funk et al. |
| 2014/0024354 A1 | 1/2014 | Haik et al. |
| 2014/0121960 A1 | 5/2014 | Park |
| 2014/0327547 A1 | 11/2014 | Johnson et al. |
| 2015/0018008 A1 | 1/2015 | Schlesinger et al. |
| 2015/0073697 A1 | 3/2015 | Barrett et al. |
| 2015/0339397 A1 | 11/2015 | Brush et al. |
| 2016/0353383 A1 | 12/2016 | Haik et al. |

FOREIGN PATENT DOCUMENTS

| | | |
|---|---|---|
| CN | 101109808 A | 1/2008 |
| CN | 101675597 A | 3/2010 |
| DE | 10042983 B4 | 3/2002 |
| JP | 4364491 A | 12/1992 |
| JP | 07-083678 | 3/1995 |
| JP | 08-271277 | 10/1996 |
| JP | 10132593 A | 5/1998 |
| JP | 11-153446 | 6/1999 |
| JP | 2002-328035 | 11/2002 |
| JP | 2004-317160 | 11/2004 |
| KR | 19970071404 A | 11/1997 |
| KR | 20040033141 A | 4/2004 |
| KR | 20040050550 A | 6/2004 |
| WO | 9800787 A2 | 1/1998 |
| WO | 2009/039161 A2 | 3/2009 |
| WO | 2012/085876 A2 | 6/2012 |

OTHER PUBLICATIONS

Subramanian, et al., "Drive-by Localization of Roadside WiFi Networks", IEEE Infocom Conference, Apr. 13-18, 2008, pp. 718-725.

(56) References Cited

OTHER PUBLICATIONS

Jeong, et al., "TBD: Trajectory-Based Data Forwarding for Light-Traffic Vehicular Networks", 29th IEEE International Conference on Distributed Computing Systems, Jun. 22-26, 2009, pp. 231-238.
Renso, et al., "Wireless Network Data Sources: Tracking and Synthesizing Trajectories", Retrieved at <<http://www.dsc.ufcg.edu.br/~sampaio/Livros/mobility-data-mining-and-privacy-geographic-knowledge-discovery.pdf#page=84>>, 2008, pp. 73-99.
"International Search Report & Written Opinion for PCT Patent Application No. PCT/US2013/058350", Mailed Date: Dec. 20, 2013, Filed Date: Sep. 6, 2013, 10 Pages.
Supplemental Notice of Allowability mailed Aug. 10, 2016 from U.S. Appl. No. 13/183,124, 7 pages.
Response and After Final Consideration Pilot Program Request filed Aug. 1, 2016 from U.S. Appl. No. 13/284,128, 13 pages.
Notice of Allowability mailed Jun. 14, 2016 from U.S. Appl. No. 13/183,124, 10 pages.
Notice of Allowability mailed Jun. 10, 2016 from U.S. Appl. No. 13/183,050, 19 pages.
Preliminary Amendment filed Jun. 15, 2016 to U.S. Appl. No. 15/181,091, 8 pages.
Notice of Allowability mailed Jun. 7, 2016 from U.S. Appl. No. 13/325,065, 18 pages.
"MEMS based motion sensing design", captured by internet archive at <<http://www.eeherald.com/section/design-guide/mems_application.html>>, Mar. 30, 2011, 2 pages.
Jin et al., "A Robust Dead-Reckoning Pedestrian Tracking System with Low Cost Sensors", 2011 IEEE International Conference on Pervasive Computing and Communications (PerCom), Seattle, Washington, Mar. 21-25, 2011, retrieved at <<http://www.ami-lab.org/uploads/Publications/Conference/WP2/Robust%20Dead-Reckoning%20Pedistrian%20Tracking%20System%20with%20Low%20Cost%20Sensors.pdf>>, Mar. 21, 2011, pp. 222-230, 9 pages.
Joachims, Thorsten, "Text categorization with Support Vector Machines: Learning with Many Relevant Features", Machine Learning, European Conference on Machine Learning, Apr. 21, 1998, pp. 137-142, 6 pages.
Beard, Kate and H. Mufstafa Palancioglu, "Estimating Positions and Paths of Moving Objects", Proceedings of the Seventh International Workshop on Temporal Representation and Reasoning, 2000, TIME 2000, pp. 155-162, 8 pages.
Biegel, Gregory and Vinny Cahill, "A Framework for Developing Mobile, Context-Aware Applications," Proceedings of the Second IEEE Annual Conference on Pervasive Computing and Communications, Mar. 14-17, 2004, pp. 361-365, 5 pages.
Billinghurst et al., "An Evaluation of Wearable Information Spaces", Proceedings of the Virtual Reality Annual International Symposium, 1998, pp. 20-27, 8 pages.
Billinghurst, Mark, "Research Directions in Wearable Computing", University of Washington, May 1998, 48 pages.
Billinghurst, Mark and Thad Starner, "Wearable Devices: New Ways to Manage Information", IEEE Computer Society, Jan. 1999, pp. 57-64, 8 pages.
Bisdikian et al., "Intelligent Pervasive Middleware for Context-Based and Localized Telematics Services," Proceedings of the Second International ACM Conference on Mobile Commerce, pp. 15-24, Sep. 2002, 11 pages.
Cabero et al., "Indoor People Tracking Based on Dynamic Weighted Multidimensional Scaling," Proceedings of the 10th ACM Symposium on Modeling, Analysis, and Simulation of Wireless and Mobile Systems, MSWIM '07, Chania, Crete Island, Greece, available at <<http://www.ri.cmu.edu/pub_filed/pub4/maria_cabero_jose_2007_1/maria_cabero_jose_2007_1.pdf>>, Oct. 22, 2007, pp. 328-335, 8 pages.
Kargl et al., "Smart Reminder—Personal Assistance in a Mobile Computing Environment," Proceedings of the International Conference on Pervasive Computing, Aug. 26-28, 2002, 6 pages.

Chen, Guanling and David Kotz, "A Survey of Context-Aware Mobile Computing Research," Dartmouth Computer Science Technical Report, 2000, 16 pages.
Kostov et al., "Travel Destination Prediction Using Frequent Crossing Pattern from Driving History", Intelligent Transportation Systems, 2005, Proceedings, IEEE, pp. 343-350, 8 pages.
Choi, Jae-Hyeong and Ki-Il Kim, "Performance Evaluation of Traffic Control Based on Geographical Information", IEEE International Conference on Intelligent Computing and Intelligent Systems, 2009, vol. 3, 2009, pp. 85-89, 5 pages.
Chun et al., "CloneCloud: Elastic Section between Mobile Device and Cloud", Proceedings of EuroSys 2011, available at <<http://eurosys2011.cs.uni-salzburg.at/pdf/eurosys2011-chun.pdf>>, Apr. 2011, pp. 301-314, 14 pages.
Collin et al., "Indoor Positioning System using Accelerometry and High Accuracy Heading Sensors", Proceedings of GPS/GNSS 2003 Conference, Available at <<http://plan.geomatics.ucalgary.ca/papers/gps03jussic.pdf>>, Sep. 2003, 7 pages.
Koyuncu et al., "A Survey of Indoor Positioning and Object Locating Systems", IJCSNS International Journal of Computer Science and Network Security, vol. 10, No. 5, May 2010, pp. 121-128, 8 pages.
De Moraes, Luis Felipe M. and Bruno Astuto A. Nunes, "Calibration-Free WLAN Location System Based on Dynamic Mapping of Signal Strength", 4th Symposium on Modeling, Analysis, and Simulation of Wireless and Mobile Systems, Oct. 2-6, 2006, MobiWac '06, Torremolionos, Malaga, Spain, Oct. 2, 2006, pp. 92-99, 8 pages.
Krumm, John and Eric Horvitz, "The Microsoft Multiperson Location Survey", Aug. 2005, Microsoft Research, 4 pages.
Ghasemzahdeh et al., "Action Coverage Formulation for Power Optimization in Body Sensor Networks," Proceedings of the 2008 Asia and South Pacific Design Automation Conference, Jan. 2008, IEEE Computer Society Press, pp. 446-451, 6 pages.
Jimenez et al., "A Comparison of Pedestrian Dead-Reckoning Algorithms using a Low-Cost MEMS IMU", WISP 2009, 6th IEEE International Symposium on Intelligent Signal Processing, Aug. 26-28, 2009, Budapest, Hungary, Aug. 26, 2009, pp. 37-42, 6 pages.
Goyal, Vishal, "MEMS Based Motion Sensing Design," EE Herald, retrieved at <<http://eeherald.com/section/design-guide/mems_application.html>>, Jul. 9, 2012, 2 pages.
Gusenbauer et al., "Self-Contained Indoor Positioning on Off-The-Shelf Mobile Devices", International Conference on Indoor Positioning and Indoor Navigation (IPIN), Sep. 2010, 9 pages.
Krumm, John and Eric Horvitz, "Predestination: Where Do You Want to Go Today?", Computer; vol. 40, Issue 4, Apr. 2007, pp. 105-107, 3 pages.
Harter, Andy and Any Hopper, "A Distributed Location System for the Active Office," IEEE Network, 1994, pp. 62-70, 9 pages.
Horvitz et al., "Attention-Sensitive Alerting in Computing Systems", Microsoft Research, Aug. 1999, 26 pages.
Horvitz, Eric and Michael SHWE, "In Pursuit of Effective Hands free Decision Support: Coupling Bayesian Inference, Speech Understanding, and User Models", 1995, 8 pages.
Krumm, John, "Real Time Destination Prediction Based on Efficient Routes," SAE Technical Paper, Paper No. 2006-01-0811, Apr. 3, 2006, 6 pages.
Lachapelle, Gerard, "GNSS Indoor Location Technologies", Journal of Global Positioning Systems (2004) vol. 3, No. 1-2, available at <<http://www.gmat.unsw.edu.au/wang/jgps/v3n12/v3n12p01.pdf>>, Nov. 15, 2004, pp. 2-11, 10 pages.
Lee, Junghoon and Gyung-Leen Park, "Design and implementation of a movement history analysis frame-work for the taxi telematics system", 14th Asia-Pacific Conference on Communications, 2008, pp. 1-4, 4 pages.
Liao et al., "Learning and Inferring Transportation Route," Proceedings of the 19th National Conference on Artificial Intelligence (AAAI), 2004, San Jose, CA, 6 pages.
Liu et al., "Remaining Delivery Time Estimation Based Routing for Intermittently Connected Mobile Networks", 28th International Conference on Distributed Computing Systems Workshops, 2008, pp. 222-227, 6 pages.

(56) References Cited

OTHER PUBLICATIONS

Losee, Robert M. Jr., "Minimizing information overload: the ranking of electronic messages", Journal of Information Science 15, Elsevier Science Publishers B.V., 1989, pp. 179-189, 11 pages.

Miyashita et al., "A Map Matching Algorithm for Car Navigation Systems that Predict User Destination", 22nd International Conference on Advanced Information Networking and Applications—Workshops, 2008, pp. 1551-1556, 6 pages.

Paul et al., "Wi-Fi Based Indoor Localization and Tracking Using Sigma-Point Kalman Filtering Methods", IEEE/ION Position, Location and Navigation Symposium, May 5, 2008, pp. 646-659, 14 pages.

Rhodes, Bradley J. and Thad Starner, "Remembrance Agent: A continuously running automated information retrieval system", The Proceedings of The First International Conference on The Practical Application of Intelligent Agents and Multi Agent Technology, 1996, pp. 487-495, 8 pages.

Rhodes, Bradley J., "The wearable remembrance agent: a system for augmented memory", Personal Technologies Journal Special Issue on Wearable Computing, 1997, 12 pages.

Rhodes, Bradley J., "The wearable remembrance agent: A system for augmented memory", The Proceedings of the First International Symposium on Wearable Computers, Oct. 1997, pp. 123-128, 9 pages.

Rogoleva, Luba, "Crowdsourcing Location Information to Improve Indoor Localization", Master Thesis, available at <<http://e-collection.ethbib.ethz.ch/eserv/eth:1224/eth-1224-01.pdf>>, Apr. 30, 2010, 91 pages.

Sananmongkhonchai et al., "Cell-based Traffic Estimation from Multiple GPS-Equipped Cars", 2009 IEEE Region 10 Conference, Jan. 2009, pp. 1-6, 6 pages.

Schilit et al., "Context-Aware Computing Applications", Proceedings of the Workshop on Mobile Computing Systems and Applications, Dec. 1994, pp. 85-90, 7 pages.

Applicant Initiated Interview Summary mailed Aug. 26, 2016 from U.S. Appl. No. 13/284,128, 10 pages.

Response filed Aug. 5, 2016 to the Non-Final Office Action mailed May 5, 2016 from U.S. Appl. No. 14/504,451, 9 pages.

International Preliminary Report on Patentability mailed Mar. 19, 2015 from PCT Patent Application No. PCT/US2013/058350, 7 pages.

Advisory Action, Applicant-Initiated Interview Summary and AFCP 2.0 Decision mailed Aug. 19, 2016 from U.S. Appl. No. 13/284,128, 6 pages.

Response filed Jul. 18, 2016 to the First Office Action mailed Mar. 3, 2016 from China Patent Application No. 201380046819.5, 10 pages.

Schilit et al., "Customizing Mobile Applications", Proceedings USENIX Symposium on Mobile and Location Independent Computing, vol. 9, Aug. 1993, 9 pages.

Schilit, Bill N. and Marvin M. Theimer, "Disseminating Active Map Information to Mobile Hosts", IEEE Network, 1994 vol. 8, No. 5, pp. 1-23, 23 pages.

Schilit et al., "The ParcTab Mobile Computing System", Fourth Working on Workstation Operating Systems, IEEE WWOS-IV, Oct. 1993, pp. 1-4, 4 pages.

Schilit, William Noah, "A System Architecture for Context-Aware Mobile Computing", Doctoral Dissertation, Columbia University, 1995, 153 pages.

Shin et al., "Sit-Down and Stand-Up Awareness Algorithm for the Pedestrian Dead Reckoning", GNSS '09, May 3-6, 2009, available at <<http://s-space.snu.ac.kr/bitstream/10371/27736/1/Sit-Down%20&20Stand-Up%20Awareness%20Algorithm%20for%20the%20Pedistrian%20Dead%20Reckoning.pdf>>, May 3, 2009, 6 pages.

Skog, Isaac and Peter Handel, "In-Car Positioning and Navigation Technologies—a Survey," IEEE Transactions on Intelligent Transportation Systems, vol. 10, No. 1, Mar. 2009, pp. 1-17, 17 pages.

Simmons et al, "Learning to Predict Driver Route and Destination Intent", Intelligent Transportation Systems Conference, 2006, pp. 127-132, 6 pages.

Spreitzer, Mike and Marvin Theimer, "Architectural Considerations for Scalable, Secure, Mobile Computing with Location Information", 14th International Conference on Distributed Computing Systems, Jun. 1994, pp. 29-38, 10 pages.

Spreitzer, Mike and Marvin Theimer, "Providing Location Information in a Ubiquitous Computing Environment", SIGOPS '93, ACM, 1993, vol. 27, No. 5, pp. 270-283, 14 pages.

Spreitzer, Mike and Marvin Theimer, "Scalable, Secure, Mobile Computing with Location Information", Communications of the ACM, vol. 36, No. 7, Jul. 1993, 1 page.

Starner, Thad Eugene, "Wearable Computing and Contextual Awareness", Massachusetts Institute of Technology, Jun. 1999, 248 pages (in two PDFs).

Terada et al., "Design of a Car Navigation System that Predicts User Destination", 7th International Conference on Mobile Data Management, 2006, pp. 145-145, 6 pages.

Theimer et al., "Operating System Issues for PDAs", Fourth Workshop on Workstation Operating Systems, 1993, 7 pages.

Toledo-Moreo et al., "Performance Aspects of Navigation Systems for GNSS-Based Road User Charging", Proceedings of the 23rd International Technical Meeting of the Satellite Division of the Institute of Navigation (ION GNSS 2010), Available at <<http://ants.inf.um.es/~josesanta/doc/ION_GNSS10.pdf>>, Sep. 2010, pp. 1157-1165, 9 pages.

Toledo-Moreo et al., "Lane-Level Integrity Provision for Navigation and map Matching With GNSS, Dead Reckoning, and Enhanced Maps", IEEE Transactions on Intelligent Transportation Systems, vol. 11 No. 1, Mar. 2010, pp. 100-112, 13 pages.

Thiagarajan et al., "Cooperative Transit Tracking using Smart-Phones," SenSys'10, Zurich, Switzerland, Nov. 3-5, 2010, pp. 85-98, 14 pages.

Vaughan-Nichols, Steven J., "Will Mobile Computing's Future Be Location, Location, Location?", Computer, vol. 42, Issue 2, 2009, pp. 14-17, 4 pages.

Want, Roy and Andy Hopper, "Active Badges and Personal Interactive Computing Objects", IEEE Transactions on Consumer Electronics, vol. 38, No. 1, 1992, 11 pages.

Want et al., "The Active Badge Location System", ACM Transactions on Information Systems, vol. 10, No. 1, Jan. 1992, pp. 91-102, 12 pages.

Wei, Chien-Hung and Ying Lee, "Development of Freeway Travel Time Forecasting Models by Integrating Different Sources of Traffic Data", IEEE Transactions on Vehicular Technology, vol. 56, Issue, 6, Part, 2; Nov. 2007, pp. 3682-3694, 13 pages.

Weiser, Mark, "Some Computer Science Issues in Ubiquitous Computing", Communications of the ACM, vol. 36, No. 7, Jul. 1993, pp. 75-84, 10 pages.

Weiser, Mark, "The Computer for the 21st Century", Scientific American, Sep. 1991, pp. 94-95, 98-102, 104, 8 pages.

Wendlandt et al., "Continuous location and direction estimating with multiple sensors using particle filtering", International Conference on Multisensory Fusion and Integration for Intelligent Systems, IEEE, Sep. 2006, pp. 92-97, 6 pages.

Workshop on Wearable Computing Systems, Aug. 19-21, 1996, retrieved at <<http://wearcam.org/computing/workshop/index.html>>, retrieved on Jan. 12, 2015, 3 pages.

Wu, Yan-Jing and Wei-Cheng Sung, "A Dynamic Navigation Scheme for Vehicular Ad Hoc Networks", 2010 Sixth International Conference on Networked Computing and Advanced Information Management (NCM), 2010, pp. 231-235, 7 pages.

Xie et al., "Development of Navigation System for Autonomous Vehicle to Meet the DARPA Urban Grand Challenge", Intelligent Transportation Systems Conference, 2007, Sep. 30-Oct. 3, 2007, Seattle, WA, pp. 767-772, 6 pages.

Xuan et al., "Crowd Sourcing Indoor Maps with Mobile Sensors", Mobile and Ubiquitous Systems: Computering, Networking and Services, MUS '10, Dec. 6, 2010, pp. 125-136, 12 pages.

Ye et al, "Predict Personal Continuous Route", 11th International IEEE Conference on Intelligent Transportation Systems, Oct. 12-15, 2008, Beijing, China, 2008, pp. 587-592, 6 pages.

(56) References Cited

OTHER PUBLICATIONS

Zhu et al., "Indoor/Outdoor Location of Cellular Handsets Based on Received Signal Strength", Electronics Letters, vol. 41, No. 1, Jan. 2005, pp. 24-26, 2 pages.
Schindler et al., "City-Scale Location Recognition", IEEE Computer Society Conference on Computer Vision and Pattern Recognition (CVPR), 2007, 7 pages.
"Ignite Where & Launch Pad", retrieved on Feb. 5, 2009 at <<http://en.oreilly.com/where2008/public/schedule/detail/2572>>, O'Reilly, Where 2.0 Conference 2008, May 2008, 4 pages.
Aalto et al., "Bluetooth and WAP Push Based Location-Aware Mobile Advertising System", retrieved on Feb. 5, 2009 at <<http://www.mediateam.oulu.fi/publications/pdf/496.pdf>>, ACM, Proceedings of the 2nd International Conference on Mobile systems, Applications and Services, MobiSYS '04, Jun. 6-9, 2004, Boston MA, pp. 49-58, 10 pages.
Azizyan, Martin, "SurroundSense: Mobile Phone Localization Using Ambient Sound and Light", retrieved on Feb. 5, 2009 at <<http://synrg.ee.duke.edu/papers/surroundsense-poster.pdf>>, Sep. 22, 2008, 1 page.
Bahl, Paramvir and Venkata N. Padmanabhan, "RADAR: An In-Building RF-based User Location and Tracking System", retrieved on Feb. 5, 2009 at <<https://research.microsoft.com/en-us/um/people/padmanab/papers/infocom2000.pdf>>, Microsoft Research, Proceedings of the 19th Annual Joint Conference of the IEEE Computer and Communications Societies, 2000, Tel-Aviv, Israel, Mar. 2000, vol. 2, pp. 775-784, 10 pages.
Balakrishnan et al., "ITR: Scalable Location-Aware Monitoring (SLAM) Systems", retrieved on Feb. 5, 2009 at <<http://nms.lcs.mit.edu/projects/slam/prop.pdf>>, Laboratory for Computer Science & Department of EECS, MIT, Cambridge, MA, Nov. 9, 2001, 31 pages.
Chang, Chia-Ming and Tai-Yu Lin, "Progressive Lane Analysis in the Digital Map using Fuzzy Method," Department of Computer Science and Engineering Tatung University, 2006, 4 pages.
Chen et al., "Modeling Route Choice Behavior from Smart-phone GPS Data," Transport and Mobility Laboratory, Ecole Polytechnique Federale de Lausanne, Nov. 5, 2009, pp. 1-12, 12 pages.
Constandache et al., "Energy-Aware Localization Using Mobile Phones", retrieved on Feb. 5, 2009 at <<http://www.cs.duke.edu/~ionut/2008_mobisys.pdf>>, Poster, ACM MobiSys, Jun. 2008, 1 page.
Flinn, Jason, "Extending Mobile Computer Battery Life through Energy-Aware Adaptation", No. CMU-CC-01-171, retrieved on Feb. 5, 2009 at <<http://reports-archive.adm.cs.cmu.edu/anon/2001/CMU-CS-01-171.pdf>>, School of Computer Science, Carnegie Mellon University, Pittsburgh, PA, Dec. 2001, 165 pages.
Gaonkar et al., "Micro-Blog: Sharing and Querying Content Through Mobile Phones and Social Participation", ACM, MobiSys 2008, Jun. 17-20, 2008, Breckenridge, CO, pp. 174-186, 13 pages.
Huang, Jiung-yao and Chung-Hsien Tsai, "Improve GPS Positioning Accuracy with Context Awareness," 2008 First IEEE International Conference on Ubi-Media Compuring, Jul. 31, 2008-Aug. 1, 2008, pp. 94-99, 6 pages.
Final Office Action mailed May 12, 2016 from U.S. Appl. No. 13/284,128, 58 pages.
Kansal, Aman and Feng Zhao, "Location and Mobility in a Sensor Network of Mobile Phones," ACM SIGMM 17th International Workshop on Network and Operating Systems Support for Digital Audio & Video (NOSSDAV), Association for Computing Machinery, Inc., Urbana, IL, 2007, 6 pages.
Krumm, John and Eric Horvitz, "Predestination: Inferring Destinations from Partial Trajectories", retrieved on Feb. 5, 2009 at <<http://research.microsoft.com/en-us/um/people/horvitz/predestination.pdf>>, UbiComp 2006: The Eighth International Conference on Ubiquitous Computing, Sep. 17-21, 2006, Orange County, CA, pp. 243-260, 18 pages.
Response filed Jan. 15, 2016 to the Non-Final Office Action mailed Sep. 17, 2015 from U.S. Appl. No. 13/284,128, 16 pages.
Krumm et al., "RightSPOT: A Novel Sense of Location for a Smart Personal Object", retrieved on Feb. 5, 2009 at <<http://research.microsoft.com/en-us/um/people/horvitz/rightspot.htm>>, Proceedings of Ubicomp 2003, vol. 2864, pp. 36-43, 8 pages.
Lamarca et al., "Place Lab: Device Positioning Using Radio Beacons in the Wild", Proceedings of Pervasive 2005, Munich, Germany, May 8, 2005, pp. 116-133, 18 pages.
Non-Final Office Action mailed Sep. 17, 2015 from U.S. Appl. No. 13/284,128, 84 pages.
Liao et al., "Extracting Places and Activities from GPS Traces Using Hierarchical Conditional Random Fields", The International Journal of Robotics Research, vol. 26, No. 1, pp. 119-134, 2007, 17 pages.
Lin et al., "Fuzzy Processing on GPS Data to Improve the Position Accuracy," Proceedings of the 1996 Asian Fuzzy Systems Symposium, 1996, Soft Computing in Intelligent Systems and Information Processing, Dec. 11-14, 1996, IEEE, pp. 557-562, 6 pages.
Lin et al., "Enabling Energy-Efficient and Quality Localization Services", retrieved on Feb. 5, 2009 at <<http://nslab.ee.ntu.edu.tw/publication/conf/qols-percom06.pdf>>, Fourth Annual IEEE International Conference on Pervasive Computing and Communications Workshops, Mar. 2006, 4 pages.
Martin et al., "Dynamic GPS-Position Correction for Mobile Pedestrian Navigation and Orientation," Proceedings of the 3rd Workshop on Positioning, Navigation and Communication, 2006, pp. 199-208, 10 pages.
Peng et al., "BeepBeep: A High Accuracy Acoustic Ranging System using COTS Mobile Devices", ACM, Proceedings of the Fifth International Conference on Embedded Networked Sensor Systems, SenSys 2007, Nov. 6-9, 2007, Sydney, Australia, 14 pages.
Person, Jon, "Writing Your Own GPS Applications: Part 2", retrieved on Feb. 5, 2009 from <<http://www.codeproject.com/KB/mobile/WritingGPSApplications2.aspx>>, The Code Project, Dec. 20, 2004, 15 pages.
Ruairi, Ronan Mac and Mark T. Keane, "An Energy-Efficient, Multi-Agent Sensor Network for Detecting Diffuse Events", retrieved on Feb. 5, 2009 at <<http://www.aaai.org/Papers/IJCAI/2007/IJCAI07-224.pdf>>, IJCAI-07, Jan. 6, 2007, pp. 1390-1395, 6 pages.
Non-Final Office Action mailed Aug. 15, 2014 from U.S. Appl. No. 13/284,128, 84 pages.
Response filed Nov. 17, 2014 to the Non-Final Office Action mailed Aug. 15, 2014 from U.S. Appl. No. 13/284,128, 15 pages.
International Search Report & Written Opinion mailed Jan. 21, 2013 from PCT Patent Application No. PCT/US2012/40140, 18 pages.
International Preliminary Report on Patentability mailed Dec. 4, 2013 from PCT Patent Application No. PCT/US2012/40140, 8 pages.
Non-Final Office Action mailed May 5, 2016 from U.S. Appl. No. 14/504,451, 10 pages.
Non-Final Office Action mailed Jun. 6, 2013 from U.S. Appl. No. 13/117,171, 16 pages.
Response filed Oct. 28, 2013 to Non-Final Office Action mailed Jun. 6, 2013 from U.S Appl. No. 13/117,171, 8 pages.
Final Office Action mailed Dec. 6, 2013 from U.S. Appl. No. 13/117,171, 12 pages.
Youssef, Moustafa and Ashok Agrawala, "The Horus WLAN Location Determination System", retrieved on Feb. 5, 2009 at <<http://www.cs.umd.edu/~moustafa/papers/horus_usenix.pdf>>, Proceedings of the 3rd International Conference on Mobile Systems, Applications and Services, 2005, pp. 205-218, 14 pages.
Zhang, Kaifu and Wei Pan, "The Two Facets of the Exploration-Exploitation Dilemma", Proceedings of the IEEE/WIC/ACM International Conference on Intelligent Agent Technology (IAT '06), 2006, pp. 371-380, 7 pages.
Non-Final Office Action mailed May 28, 2014 from U.S. Appl. No. 13/183,124, 42 pages.
Response filed Sep. 29, 2014 to the Non-Final Office Action mailed May 28, 2014 from U.S. Appl. No. 13/184,124, 13 pages.
Non-Final Office Action mailed Feb. 3, 2015 from U.S. Appl. No. 13/183,124, 33 pages.
Response filed May 4, 2015 to the Non-Final Office Action dated Feb. 3, 2015 from U.S. Appl. No. 13/183,124, 16 pages.

(56) References Cited

OTHER PUBLICATIONS

Notice of Allowance and Examiner Initiated Interview Summary mailed Jul. 22, 2015 from U.S. Appl. No. 13/183,124, 48 pages.
Supplemental Notice of Allowability mailed Aug. 4, 2015 from from U.S. Appl. No. 13/183,124, 7 pages.
Supplemental Notice of Allowability mailed Aug. 27, 2015 from from U.S. Appl. No. 13/183,124, 2 pages.
Notice of Allowance mailed Nov. 16, 2015 from U.S. Appl. No. 13/183,124, 14 pages.
Non-Final Office Action mailed Sep. 24, 2013 from U.S. Appl. No. 13/183,050, 20 pages.
Applicant Initiated Interview Summary mailed Dec. 26, 2013 from U.S. Appl. No. 13/183,050, 3 pages.
Official Action mailed Mar. 25, 2014 Withdrawing/Vacating previous Office Action from U.S. Appl. No. 13/183,050, 2 pages.
Non-Final Office Action mailed Jun. 11, 2014 from U.S. Appl. No. 13/183,050, 41 pages.
Response filed Oct. 10, 2014 to the Non-Final Office Action mailed Jun. 11, 2014 from U.S. Appl. No. 13/183,050, 11 pages.
Final Office Action mailed Nov. 26, 2014 from U.S. Appl. No. 13/183,050, 22 pages.
Response filed Feb. 25, 2015 to Final Office Action mailed Nov. 26, 2014 from U.S. Appl. No. 13/183,050, 17 pages.
Non-Final Office Action mailed Jun. 18, 2015 from U.S. Appl. No. 13/183,050, 24 pages.
Notice of Allowance, Office Action Appendix and Applicant-Initiated Interview Summary mailed Oct. 20, 2015 from U.S. Appl. No. 13/183,050, 92 pages.
Notice of Allowance mailed Mar. 14, 2016 from U.S. Appl. No. 13/183,050, 49 pages.
Notice of Allowance mailed Feb. 29, 2016 from U.S. Appl. No. 13/183,124, 24 pages.
Sun et al., "Signal Processing Techniques in Network-Aided Positioning—A survery of state-of-the-art positioning designs", IEEE Signal Processing Magazine, Jul. 2005, vol. 22, No. 4, pp. 12-23, 12 pages.
Smailagic, Asim and David Kogan, "Location Sensing and Privacy in a Context-Aware Computing Environment", IEEE Wireless Communications, Oct. 2002, pp. 10-17, 8 pages.
Non-Final Office Action mailed Oct. 24, 2013 from U.S. Appl. No. 13/325,065, 47 pages.
Response filed Jan. 23, 2014 from U.S. Appl. No. 13/325,065, 20 pages.
Notice of Allowance mailed Jun. 4, 2014 from U.S. Appl. No. 13/325,065, 12 pages.
Notice of Allowance mailed Sep. 19, 2014 from U.S. Appl. No. 13/325,065, 7 pages.
Notice of Allowance mailed Dec. 31, 2014 from U.S. Appl. No. 13/325,065, 5 pages.
Notice of Allowance mailed Jun. 5, 2015 from U.S. Appl. No. 13/325,065, 6 pages.
Notice of Allowance mailed Sep. 10, 2015 from U.S. Appl. No. 13/325,065, 6 pages.
Corrected Notice of Allowability mailed Oct. 22, 2015 from U.S. Appl. No. 13/325,065, 2 pages.
Notice of Allowance mailed Dec. 17, 2015 from U.S. Appl. No. 13/325,065, 18 pages.
Notice of Allowance mailed Mar. 28, 2016 from U.S. Appl. No. 13/325,065, 11 pages.
First Office Action mailed Mar. 3, 2016 from China Patent Application No. 201380046819.5, 14 pages.
Non-Final Office Action mailed Jun. 28, 2011 from U.S. Appl. No. 12/417,752, 15 pages.
Response filed Oct. 27, 2011 to Non-Final Office Action mailed Jun. 28, 2011 from U.S. Appl. No. 12/417,752, 17 pages.
Final Office Action mailed Sep. 13, 2012 from U.S. Appl. No. 12/417,752, 18 pages.
Response filed Dec. 13, 2012 to Final Office Action mailed Sep. 13, 2012 from U.S. Appl. No. 12/417,752, 13 pages.
Non-Final Office Action mailed May 24, 2013 from U.S. Appl. No. 12/417,752, 18 pages.
Response filed Jul. 2, 2013 to Non-Final Office Action mailed May 24, 2013 from U.S. Appl. No. 12/417,752, 16 pages.
Final Office Action mailed Jul. 17, 2013 from U.S. Appl. No. 12/417,752, 18 pages.
International Search Report and Written Opinion mailed Dec. 12, 2008 from PCT Patent Application No. PCT/US2008/067808, 8 pages.
International Search Report mailed Sep. 29, 2003 from PCT Patent Application No. PCT/US00/20685, 3 pages.
Response filed Sep. 30, 2013 to Final Office Action mailed Jul. 17, 2013 from U.S. Appl. No. 12/417,752, 18 pages.
Non-Final Office Action mailed Oct. 29, 2013 from U.S. Appl. No. 12/417,752, 17 pages.
Response filed Dec. 23, 2013 to Non-Final Office Action mailed Oct. 29, 2013 from U.S. Appl. No. 12/417,752, 21 pages.
Final Office Action, Examiner Initiated Interview Summary and Applicant Initiated Interview Summary mailed Feb. 25, 2014 from U.S. Appl. No. 12/417,752, 26 pages.
Requirement for Restriction/Election mailed Mar. 20, 2014 from U.S. Appl. No. 13/152,299, 6 pages.
Response filed Apr. 2, 2014 to Requirement for Restriction/Election mailed Mar. 20, 2014 from U.S. Appl. No. 13/152,299, 6 pages.
Non-Final Office Action mailed May 7, 2014 from U.S. Appl. No. 13/152,299, 4 pages.
Response filed May 19, 2014 to Non-Final Office Action mailed May 7, 2014 from U.S. Appl. No. 13/152,299, 6 pages.
Notice of Allowance mailed Jun. 17, 2014 from U.S. Appl. No. 13/152,299, 7 pages.
Notice of Allowance mailed Oct. 31, 2014 from U.S. Appl. No. 13/152,299, 5 pages.
Xiong et al., "ArrayTrack: A Fine-Grained Indoor Location System", 13th International Workshop on Mobile Computing System and Applications, Feb. 28, 2012, pp. 1-6, 6 pages.
Youssef et al., "The Horus WLAN Location Determination System", 3rd International Conference on Mobile Systems, Applications and Services, Jun. 6, 2005, pp. 205-218, 14 pages.
Zheng et al., "HIPS: A Calibration-less Hybrid Indoor Positioning System Using Heterogeneous Sensors", IEEE International Conference on Pervasive Computing and Communications, Mar. 9, 2009, pp. 1-6, 6 pages.
Request for Examination and Voluntary Amendment filed Sep. 6, 2016 from Japanese Patent Application No. 2015-531214, 11 pages.
Non-Final Office Action mailed May 11, 2015 from U.S. Appl. No. 13/606,008, 24 pages.
Response filed Nov. 11, 2015 to the Non-Final Office Action mailed May 11, 2015 from U.S. Appl. No. 13/606,008, 13 pages.
Notice of Allowance and Examiner-Initiated Interview Summary mailed Dec. 9, 2015 from U.S. Appl. No. 13/606,008, 19 pages.
Non-Final Office Action mailed Nov. 8, 2016 from U.S. Appl. No. 13/284,128, 47 pages.
Second Office Action mailed Nov. 3, 2016 from Chinese Patent Application No. 201380046819.5, 10 pages.
ExParte Quayle Office Action mailed Nov. 17, 2016 from U.S. Appl. No. 14/504,451, 6 pages.
Supplemental Notice of Allowability mailed Sep. 13, 2016 from U.S. Appl. No. 13/183,124, 6 pages.
Supplemental Notice of Allowability mailed Sep. 13, 2016 from U.S. Appl. No. 13/183,050, 6 pages.
"Time Domain", captured by the Internet archive at <<http://web.archive.org/web/20111026011954/http://www.timedomain.com/>> on Oct. 26, 2011, 2 pages.
Alzantot et al., "IPS: Ubiquitous Indoor Positioning System", retrieved at <<http://wrc.ejust.edu.eg/IPS.html>> on Apr. 17, 2012, pp. 1-3, 3 pages.
Smith et al., "On the Representation and Estimation of Spatial Uncertainty", International Journal of Robotics Research, vol. 5, No. 4, May 1986, pp. 56-68, 13 pages.
Balas, Ciprian-Mihai, "Indoor Localization of Mobile Devices for a Wireless Monitoring System Based on Crowdsourcing", 2011, Master of Science, Computer Science, School of Informatics, University of Edinburgh, 78 pages.

(56) References Cited

OTHER PUBLICATIONS

Bauer et al., "Using Wireless Physical Layer Information to Construct Implicit Identifiers", Hot Topics in Privacy Enhancing Technologies, Jul. 2008, 15 pages.

Beauregard et al., "Pedestrian Dead Reckoning: A Basis for Personal Positioning", Proceedings of the 3rd Workshop on Positioning, (WPNC'06), Navigation and Communication, Mar. 16, 2006, pp. 27-36, 10 pages.

Brik et al., "Wireless Device Identification with Radiometric Signatures", 14th ACM International Conference on Mobile Computing and Networking, Sep. 14-19, 2008, pp. 1-13, 13 pages.

Bulusu et al., "GPS-Less Low Cost Outdoor Localization for Very Small Devices", IEEE Personal Communications, vol. 7, Issue 5, Oct. 2000, pp. 28-34, 7 pages.

Chintalapudi et al., "Indoor Localization without the Pain", Sixteenth Annual International Conference on Mobile Computing and Networking, Sep. 20, 2010, pp. 173-184, 12 pages.

Fox et al., "Monte Carlo Localization: Efficient Position Estimation for Mobile Robots", Sixteenth National Conference on Artificial Intelligence, Jul. 1999, pp. 343-349, 7 pages.

Goswami et al., "WiGEM: A Learning-Based Approach for Indoor Localization", Seventh Conference on Emerging Networking Experiments and Technologies, Dec. 6, 2011, pp. 1-12, 12 pages.

Kim et al., "A Step, Stride and Heading Determination for the Pedestrian Navigation System", Journal of Global Positioning Systems, vol. 3, Issue 1-2, Nov. 15, 2004, pp. 273-279, 7 pages.

Krumm et al., "Minimizing Calibration Effort for an Indoor 802.11 Device Location Measurement System", retrieved at <<http://research.microsoft.com/pubs/68919/tr-2003-82.pdf>>, Microsoft Research, Tech. Report. MSR-TR-2003-82, Nov. 13, 2003, pp. 1-9, 9 pages.

Lee et al., "Crowdsourced Radiomap for Room-Level Place Recognition in Urban Environment", 8th IEEE International Conference on Pervasive Computing and Communications Workshops (PERCOM Workshops), Mar. 29, 2010, pp. 648-653, 6 pages.

Leonard et al., "Simultaneous Map Building and Localization for an Autonomous Mobile Robot", International Workshop on Intelligent Robots and Systems, Nov. 3-5, 1991, pp. 1442-1447, 6 pages.

Padmanabhan, Venkat, "The Quest for Zero-Effort Indoor Localization", retrieved at <<http://www.pdl.cmu.edu/SDI/2012/043012.html>> on Apr. 17, 2012, 1 page.

Robertson et al., "Simultaneous Localization and Mapping for Pedestrians using only Foot-Mounted Inertial Sensors", 11th International Conference on Ubiquitous Computing, Sep. 30, 2009, pp. 93-96, 4 pages.

Sen et al., "Precise Indoor Localization using PHY Layer Information", 9th International Conference on Mobile Systems, Applications and Services, Nov. 14-15, 2011, pp. 1-6, 6 pages.

Sen et al., "SpinLoc: Spin Once to Know Your Location", 13th Workshop on Mobile Computing Systems & Applications, Feb. 28-29, 2012, pp. 1-6, 6 pages.

Response filed Jan. 17, 2017 to the Second Office Action dated Nov. 3, 2016 from Chinese Patent Application No. 201380046819.5, 12 pages.

Amendment and Response filed Jan. 17, 2017 to the Ex Parte Quayle Office Action dated Nov. 17, 2016 from U.S. Appl. No. 14/504,451, 8 pages.

Response filed Feb. 2, 2017 to the Non-Final Office Action dated Nov. 8, 2016 from U.S. Appl. No. 13/284,128, 18 pages.

Applicant-Initiated Interview Summary dated Feb. 6, 2017 from U.S. Appl. No. 13/284,128, 3 pages.

Ex Parte Quayle Office Action dated Mar. 23, 2017 from U.S. Appl. No. 14/504,451, 30 pages.

Third Office Action dated May 2, 2017 from Chinese Patent Application No. 201380046819.5, 9 pages.

Communication pursuant to Article 94(3) EPC dated Jul. 18, 2017 from European Patent Application No. 13766758.0, 3 pages.

\* cited by examiner

ESTIMATING AND PREDICTING STRUCTURES PROXIMATE TO A MOBILE DEVICE

BACKGROUND

Many mobile devices include global navigation satellite system (GNSS) technology to determine the location of the mobile device. The most commonly used GNSS is the global positioning system (GPS). Present GPS technology works well in relatively unobstructed environments that provide direct line-of-sight to GPS satellites in the sky. However, in urban environments with high-rise buildings, the mobile devices may fail to derive their locations due to partial satellite visibility. Alternatively, even if the mobile devices do determine their location, the location errors tend to be very large. These large accuracy errors tend to diminish the value of the location for various purposes.

SUMMARY

The described implementations relate to mobile device location and more specifically to determining the location of the mobile device and/or the presence of obstructions proximate to the mobile device. One example can identify global navigation satellite system (GNSS) satellites expected to be in line-of-sight of the mobile device. This example can detect differences between received GNSS data signals and expected GNSS data signals from the expected GNSS satellites. The example can also determine a direction from the mobile device of an obstruction that is causing at least some of the detected differences.

Another example can include an obstruction-detection module configured to detect obstructions relative to a mobile device. This example can also include a prediction module configured to predict future effects of the obstruction on the mobile device based at least in part on a location of the obstruction and a direction of travel of the mobile device.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

This patent relates to mobile devices and accurately determining a location of mobile devices relative to obstructions that are proximate to the mobile devices. The present concepts can compare expected global navigation satellite system (GNSS) data signals to actual GNSS data signals received by a mobile device to identify features in the environment proximate to the mobile device. Differences between the expected GNSS data signals and the received GNSS data signals can be utilized to identify obstruction(s) proximate to the mobile device and the location of the obstruction relative to the mobile device. The location of the mobile device and the obstruction can be utilized for various purposes. For instance, the location of the mobile device and/or the obstruction can be utilized to enhance the location information of the mobile device. In another example, the location of the mobile device and the obstruction can be utilized to predict the quality of future GNSS signals received by the mobile device. The mobile device can be controlled based upon the prediction.

Figure 1:
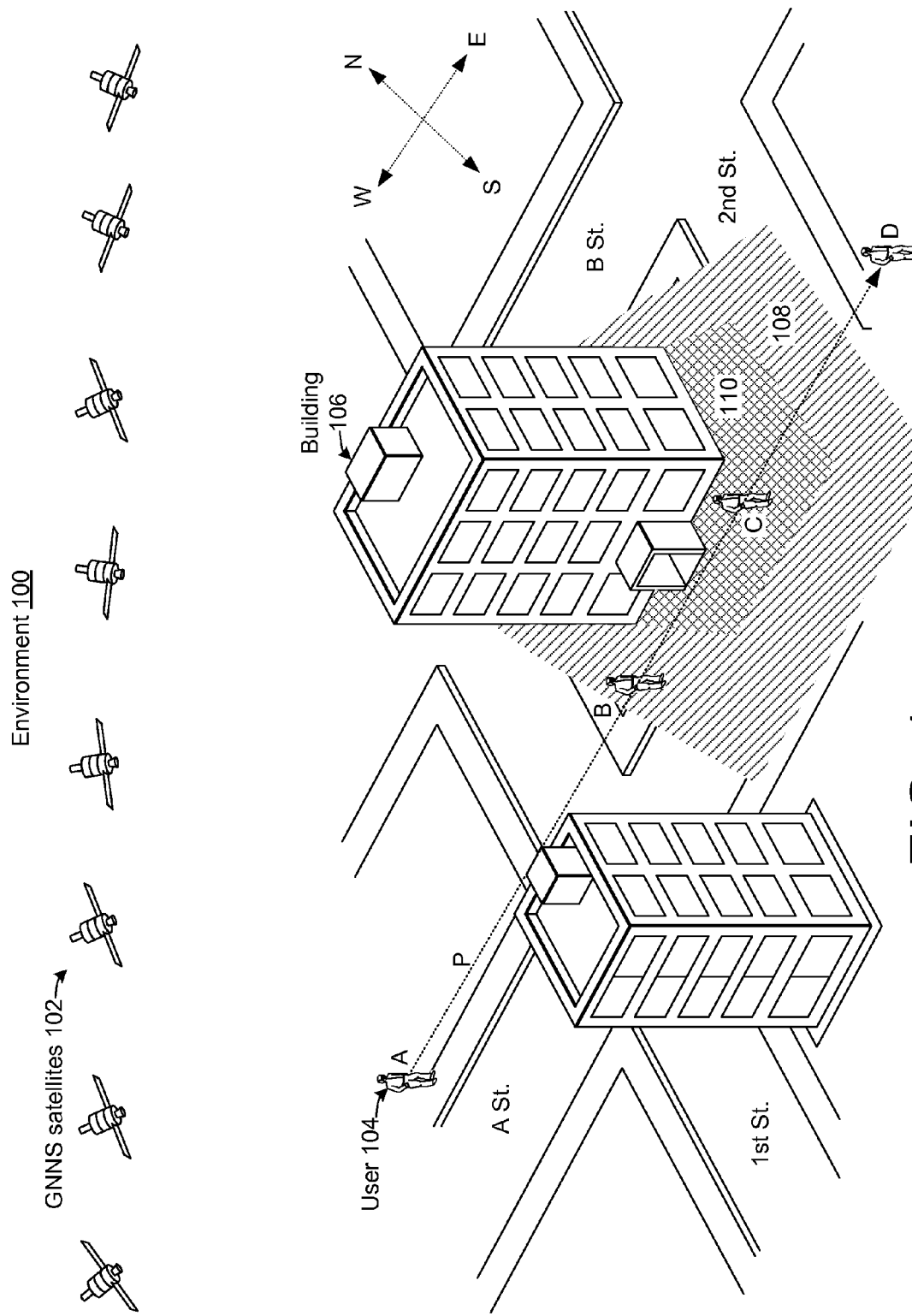
FIG. 1 shows an example scenario or environment upon which the present mobile device location concepts can be employed in accordance with some implementations.

For purposes of explanation, consider introductory FIG. 1 of an environment 100 in which the present concepts can be employed. Environment 100 includes multiple global navigation satellite system (GNSS) satellites 102, a user 104, and an obstruction in the form of a building 106. Though not visible due to the drawing scale, assume that the user is carrying a mobile device and that the user is traveling along a path P. At position A along path P, the mobile device can receive GNSS signals from all of the overhead GNSS satellites. In such an instance, the expected GNSS signals would tend to match the received GNSS signals.

At position B along path P, the mobile device does not receive GNSS signals from some of the GNSS satellites due to building 106 obstructing the GNSS signals. In this case, the received GNSS signals do not match the expected GNSS signals in that the GNSS signals from some of the overhead GNSS satellites are blocked. Stated another way, known satellite flight information can be utilized as the basis for the expected GNSS signals. A delta between the expected GNSS signals and the received signals can be indicative of signal loss caused by an obstruction. Despite the signal loss at position B, GNSS signals are received from enough of the GNSS satellites to allow the mobile device to accurately determine its location. Position B can be thought of as a point in a penumbral region 108 where signals from some GNSS satellites are blocked, but signals are received from enough GNSS satellites to allow a mobile device in the penumbral region to accurately determine its location using GNSS location techniques.

Subsequent location or position C along path P can be within an umbral region 110. In the umbral region, so many GNSS satellites are blocked that the mobile device cannot accurately determine its location using GNSS location techniques. At position D along path P the user has emerged from the penumbral region 108 and umbral region 110 and once again the received GNSS signals match the expected GNSS signals.

The present implementations can recognize the penumbral region 108 and/or umbral region 110. Recognizing these regions can be utilized in various ways. For instance, detection of the penumbral region 108 and/or umbral region 110 can allow the relative location of the mobile device and/or the obstruction to be determined. In another example, detection of the penumbral region 108 and/or umbral region 110 can be utilized to control the mobile device in a manner that is more effective than would otherwise be the case. These aspects are described in more detail below.

Exemplary System

Figure 2:
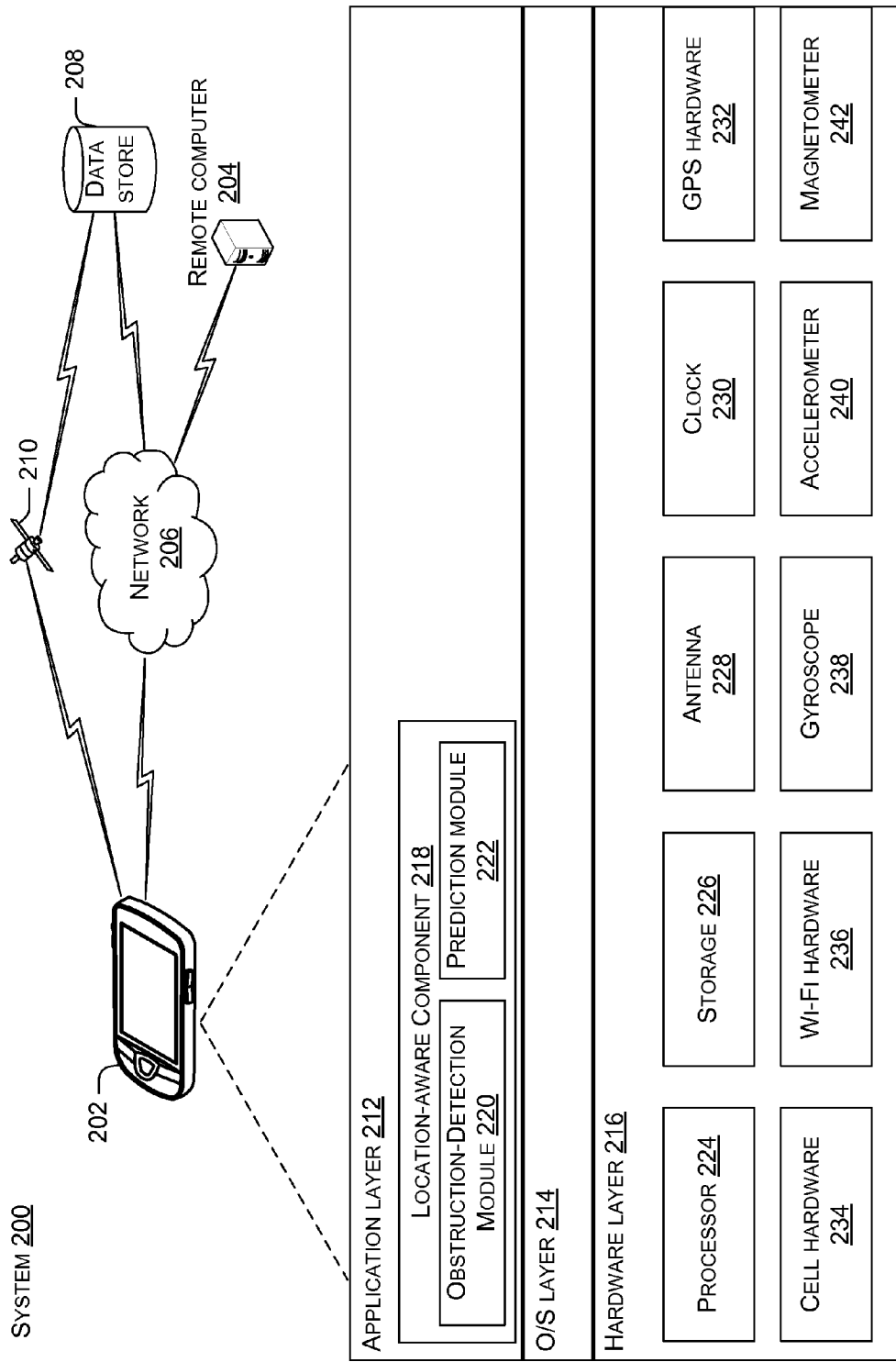
FIG. 2 illustrates an example system which can implement the present mobile device location concepts in accordance with some implementations.

FIG. 2 shows an example system 200 that includes a mobile computing device (mobile device) 202, a remote computing device or computer 204, a network 206, a data store 208, and a Global Positioning System (GPS) satellite 210. GPS is a form of GNSS that is in widespread use. As such, much of the remainder of the document references GPS technologies, but is equally applicable to other GNSS technologies.

Mobile device 202 includes an application layer 212, an operating system (O/S) layer 214, and a hardware layer 216.

In this configuration, the application layer 212 includes a location-aware component 218. The location-aware component can include an obstruction-detection module 220 and a prediction module 222.

The hardware layer 216 can include a processor 224, storage 226, an antenna 228, a clock 230, GPS hardware 232, cell hardware 234, Wi-Fi hardware 236, a gyroscope 238, an accelerometer 240, and a magnetometer 242.

GPS hardware 232 can function as an absolute location mechanism that can determine an absolute location of the mobile device 202 on or above the earth.

Cell hardware 234, Wi-Fi hardware 236, gyroscope 238, accelerometer 240, and magnetometer 242 can function as relative location mechanisms that provide location and/or movement data in relation to an absolute location. For example, gyroscope 238, accelerometer 240, and magnetometer 242 can sense movement of the mobile device from an absolute location determined by the GPS hardware 232. Similarly, the Wi-Fi hardware can detect one or more wireless access points. The location of the wireless access points may be obtained from data store 208 to estimate movement of the mobile device since the last absolute location was obtained.

In summary, the obstruction-detection module 220 is configured to detect obstructions relative to a mobile device. The obstruction-detection module 220 can leverage the trajectory of GPS to reliably infer which side of a street (and/or building) a mobile device is located. In some cases, the obstruction-detection module 220 can combine (1) the recent location trajectory reported from a location service, (2) the time of signal acquisition or failure of acquisition of each satellite, and/or (3) ephemeral information of each satellite from data store 208. One rationale is that buildings on the street sides can create an urban canyon that exposes a different set of satellites to mobile devices on the different sides of the street or on different sides of an individual building. Of course, other man made and/or natural obstructions, such as canyons, tunnels, stadiums, cliffs, hills, etc. can be detected.

The obstruction-detection module 220 can also leverage Wi-Fi access point (AP) information (or other wireless protocol information) where available. In such cases, mobile devices on different sides of the street (or building) will likely see different sets of Wi-Fi APs installed in the buildings. If a database of the Wi-Fi APs is available, the set of Wi-Fi APs can be used in a similar way as the set of visible satellites to infer which side of the street (or building) the mobile device is located.

Briefly, determining a location via GPS techniques can involve two types of data that are sent from the GPS satellite as 'GPS data signals' or for the sake of brevity 'GPS signals'. The two data types are time related data or time stamps and trajectory data. The trajectory data includes ephemeris data and GPS satellites' trajectories. The ephemeris data are broadcast by the satellites or can be obtained from the internet, (e.g. through NASA), such as at data store 208. By knowing the rough location of the mobile device, from cell-tower IDs, Wi-Fi signatures and/or signal strengths, or recent GPS location, the obstruction-detection module 220 can infer which sets of satellites should be visible if there were no obstruction (e.g., available satellites). The obstruction-detection module 220 can also examine the signal strengths and CDMA correlation peaks at the GPS hardware 232. The obstruction-detection module 220 can further infer which satellites are not visible in reality. The not visible (e.g., missing or obstructed) satellites can indicate the presence of an obstruction and the direction of the obstruction. For example, if all satellites that are in the North sky, according to the ephemeris data, are not visible (e.g., GPS signal not received or received below a threshold level), then the obstruction is to the North of the mobile device.

Stated another way, the obstruction-detection module 220 can infer the relative location of the mobile device 202 with respect to obstructions, such as buildings, based on three types of information. First, the obstruction-detection module can utilize raw GPS signal quality for each GPS satellite at the mobile device. For instance, the presence of an obstruction can be inferred when signal strength from one or more available satellites falls below a threshold level. For example if strong (e.g., above a threshold) signals are received from a set of satellites and then a few seconds later the signal strength of one or more of the satellites falls below the threshold, an obstruction may be the cause. Second, the obstruction-detection module can utilize the location of possibly visible (e.g., available) GPS satellites leveraging publicly available satellite ephemeris published by authorities. Alternatively or additionally, the obstruction-detection module can utilize 3-D urban building models stored in data store 208.

In some configurations, the obstruction-detection module 220 can contribute to generating the 3-D urban building models. For instance, the obstruction-detection module 220 can contribute to a crowd sourcing approach to construct penumbral and umbral regions. In such a configuration, mobile devices can provide traces on their relative positions to buildings or other obstructions. This tracing data can be used to build models for the "umbra" and "penumbra" of the buildings and use the results with alternative location tracking methods, such as inertial-navigation. The information can be stored in the data store 208 and accessed by mobile devices that are subsequently near the location. Of course, user privacy can be addressed in any mobile device scenario, such as crowd sourcing implementations. For instance, users can be notified and allowed to opt in or opt out of any data gathering. Alternatively or additionally, such data can be gathered in a manner that cannot be correlated to an individual user or individual mobile device (e.g., an unspecified device was at "_____" location and reported "_____" location-related information).

In summary, in some implementations, the location-aware component 218 can estimate the location of obstructions and predict their effect upon the mobile device 202 based solely upon GPS data or information gathered by the mobile device. In other configurations the location-aware component 218 can augment or replace this self-gathered information with information gathered by other mobile devices around the same location.

In one case, the obstruction-detection module 220 can be configured to access a crowd-sourcing database to obtain additional information about obstructions proximate to a location of the mobile device 202. The prediction module 222 can be configured to utilize this additional information from the crowd-sourcing database to predict any future effects associated with the obstructions. The obstruction-detection module 220 can also be configured to contribute obstruction-related information, such as penumbral and umbral zone information (e.g., self gathered information) about the obstructions to the crowd-sourcing database. Thus, individual mobile devices can both contribute to, and benefit from, the crowd-source model.

In some implementations, the obstruction-detection module 220 can employ various techniques to address multipath propagation of satellite signals. In some cases, signals from an individual GPS satellite can be reflected from nearby objects such as tall buildings. The reflected signals can then be received by the mobile device 202. One technique that can be utilized by the obstruction-detection module is a comparison of the received GPS signal to a signal threshold of a predefined (or dynamically determined) value. For example, received GPS signals can be compared to the predefined threshold. Any GPS signals that are below the threshold can be filtered out and not analyzed further. Such a configuration can separate unobstructed line of sight GPS satellite from obstructed GPS satellites. These relatively weaker signals of the obstructed GPS satellites can be filtered out and eliminated from the visible set. From another perspective, the GPS signals that fall below the predefined threshold can be considered as indicators of a possible obstruction. The indicators can then be used as a trigger to perform further analysis on the received GPS signals to identify and/or locate the obstruction and/or refine the location of the mobile device.

The prediction module 222 is configured to predict future effects of the obstruction on the mobile device 202 based at least in part on a location of the obstruction and a direction of travel of the mobile device. For instance, the prediction module can predict when or if the mobile device will enter the umbral region and/or emerge from the umbral region given a particular path. The prediction module can also update the prediction if the user (e.g., mobile device) changes paths. This aspect is discussed in more detail below. The prediction module can receive information from any of the gyroscope 238, accelerometer 240, and/or magnetometer 242 relating to a path change (e.g., direction change and/or velocity change).

Mobile device 202 and remote computer 204 can be thought of as computers or computing devices as defined to be any type of device that has some amount of processing capability and/or storage capability. Processing capability can be provided by one or more processors that can execute data in the form of computer-readable instructions to provide a functionality. Data, such as computer-readable instructions, can be stored on storage/memory. The storage/memory can be internal and/or external to the computer. The storage/memory can include any one or more of volatile or non-volatile memory, hard drives, flash storage devices, and/or optical storage devices (e.g., CDs, DVDs etc.), among others. As used herein, the term "computer-readable media" can include signals. In contrast, the term "computer-readable storage media" excludes signals. Computer-readable storage media can include "computer-readable storage devices". Examples of computer-readable storage devices include volatile storage media, such as RAM, and non-volatile storage media, such as hard drives, optical discs, and flash memory, among others.

In the illustrated implementation, mobile device 202 and remote computer 204 are configured with general purpose processors and storage/memory. In some configurations, such devices can include a system on a chip (SOC) type design. In such a case, functionalities can be integrated on a single SOC or multiple coupled SOCs. In one such example, the computing device can include shared resources and dedicated resources. An interface(s) can facilitate communication between the shared resources and the dedicated resources. As the name implies, dedicated resources can be thought of as including individual portions that are dedicated to achieving specific functionalities. For instance, in this example, the dedicated resources can include any of GPS hardware 232, cell hardware 234, Wi-Fi hardware 236, gyroscope 238, accelerometer 240, and/or magnetometer 242.

Shared resources can be storage, processing units, etc. that can be used by multiple functionalities. In this example, the shared resources can include the processor and/or storage/memory. In one case, the location-aware component 218 can be implemented as dedicated resources. In other configurations, this component can be implemented on the shared resources and/or the processor can be implemented on the dedicated resources.

In some configurations, the location-aware component 218 can be installed during manufacture of the mobile device 202 or by an intermediary that prepares the mobile device for sale to the end user. In other instances, the end user may install the location-aware component, such as in the form of a downloadable application or from a USB thumb drive, among others.

In the illustrated configuration the location-aware component 218 is manifest on the mobile device 202. In other configurations, the location-aware component can alternatively or additionally be manifest on another device. For instance, the location-aware component could be manifest on the remote computer 204. In such a case, location-related data can be sent from the mobile device to the remote computer for processing. The remote computer can then return processed location-related data to the mobile device.

In still another configuration, a portion of the functionality offered by the location-aware component could be performed on the mobile device while another portion can be performed on the remote computer. For instance, the obstruction-detection module could be located on the mobile device and the prediction module could be located on the remote computer. In such a configuration GPS signal data can be processed on the mobile device to generate location information and any associated obstruction information. The information can be sent to the remote computer which can further process the information. The remote computer may utilize additional information such as 3-D map information to predict how the mobile device may be affected by obstructions. The remote computer can send the predictions to the mobile device. The mobile device can then base further controls upon the predictions. Further, the mobile device may suggest a direction of movement to the user that may result in a better signal reception. For instance, the mobile device may display a GUI that says "Inadequate signal reception-move 100 feet West for better reception."

Example Scenarios

FIGS. 3-6 collectively illustrate example scenarios in which the present mobile device location concepts can be employed. FIGS. 3-6 involve a user 104 and six GPS satellites 210(1)-210(6). In this case assume that user 104 is carrying a mobile device (such as mobile device 202 of FIG. 2). Since the mobile device is not visible, some of the following description will reference mobile device 202 of FIG. 2. The skilled artisan should recognize that other mobile devices and/or other computers can perform the described operations.

While six GPS satellites 210(1)-210(6) are illustrated for sake of brevity, there are commonly eight or nine GPS satellites over any given location at a particular time. (The use of six GPS satellites is not intended to be limiting and the present concepts apply to scenarios involving less than six or more than six satellites). Note further, that attempting to determine location uses power, which tends to be a precious resource on mobile devices. Thus, mobile devices tend to attempt to determine their location periodically rather than constantly to reduce power consumption.

Figure 3:
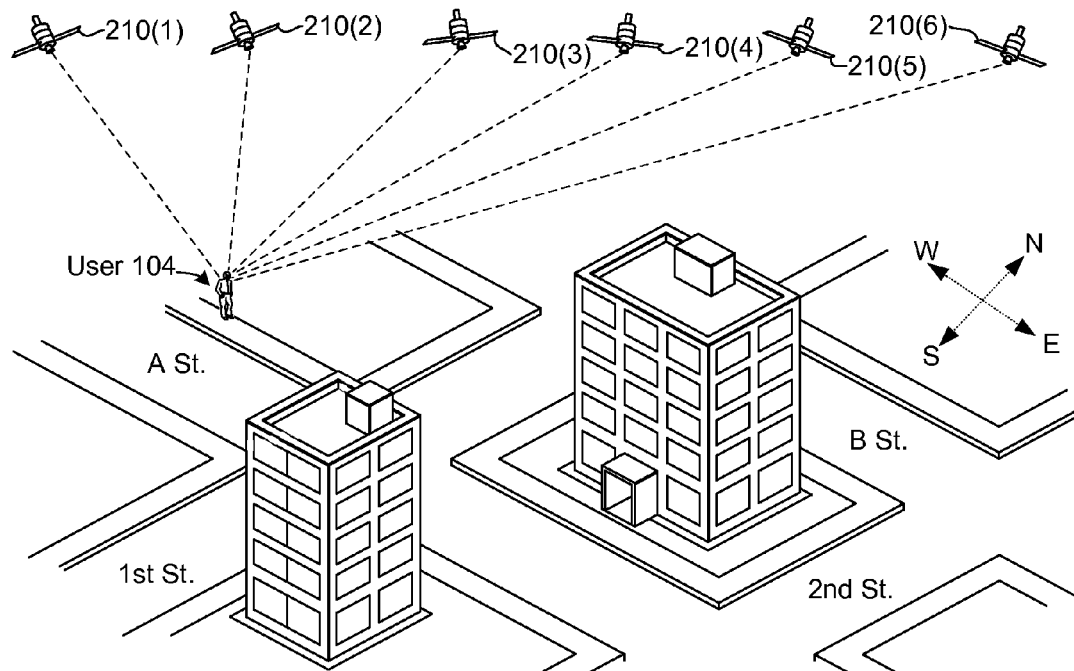
FIGS. 3-6 show example scenarios or environments upon which the present mobile device location concepts can be employed in accordance with some implementations.

In FIG. 3 the user 104 is in line-of-sight of all six GPS satellites 210(1)-210(6). That is the user's mobile device can receive signals from each GPS satellite of such a signal quality as to be useful for determining the user's location. In this case, a GPS signal can be received from each of the six available GPS satellites and the signals are not obstructed or degraded so the received signals can match the expected signals. Briefly, the mobile device can use the GPS satellite signals as well as ephemeris information about the location of the satellites to determine the device's location. Note that many present GPS technologies tend to require signals from at least four GPS satellites to accurately determine a location of the mobile device. Thus, in the scenario of FIG. 3, the mobile device can readily receive GPS signals from six satellites and using those GPS signals can accurately determine a location of the user (e.g., mobile device).

For purposes of explanation, assume at the point illustrated in FIG. 3, the mobile device receives signals according to default periodic setting of the mobile device (e.g., the mobile device attempts to receive GPS signals periodically, such as once per minute). In this case, the mobile device receives signals from the six satellites and determines its location from the signals. Assume further that the determined location is accurate to within +/−10 meters in any direction. The mobile device can determine that the user is on A Street from this location information. However, the mobile device may not be able to accurately determine whether the user is on the North side of A Street or the South side of A Street.

GPS hardware 232 can determine the location of mobile device 202 by receiving and processing digital communication signals sent from overhead GPS satellites 210(1)-210(6) (e.g., GPS signals). Presently, there are 32 GPS satellites (also called space vehicles, or SVs), each orbiting the earth roughly two cycles a day. A set of ground stations monitor these satellites' trajectory and health, then send the satellite trajectory parameters to the satellites. In particular, there are two kinds of trajectory information: the almanac, which contains the coarse orbit and status information, and the ephemeris, which contains the precise information of satellite trajectory. The GPS satellites are time synchronized to within a few nanoseconds.

The GPS satellites simultaneously and continuously broadcast time and orbit information through Code Division Multiple Access CDMA signals at 1.575 GHz towards the earth. (CDMA is a communication protocol and method). The transmission data rate is at 50 bps. Each GPS satellite encodes this signal using a satellite specific C/A code of length 1023 chips at 1023 kbps (CDMA encoding). Thus, the C/A code repeats every millisecond resulting in 20 repetitions of the C/A code during each data bit sent.

A full data packet from a GPS satellite broadcast is 30 seconds long, containing 5 six-second long frames. A frame has a preamble, called Telemetry Word (TLM), and a time stamp, called Handover Word (HOW). Ephemeris of the transmitting GPS satellite and the almanac of all GPS satellites are contained in each data packet. In other words, a precise time stamp can be decoded every 6 seconds, and the high accuracy satellite trajectory can be decoded every 30 seconds. The ephemeris information is constantly updated by the ground stations. In theory, the ephemeris data included in the SV broadcast is only valid for 30 minutes. These data rates explain why standalone GPS may take about 30 seconds or more to obtain a location fix, since all information has to be received and decoded from the satellite signals. In mobile devices, the coarse-grained satellite trajectory parameters tend to be downloaded from a server or other resource, such as data store 208. Thus, a low accuracy time to first fix (TTFF) can be reduced to 6 seconds.

Three pieces of information can be utilized to determine the location of the mobile device. These pieces of information can include: 1) a time stamp, 2) the GPS satellites' orbits at the time, and 3) the approximated distances (called the pseudorange) from each GPS satellite to the mobile device at the time. Among these, in some implementations, the key is to obtain the pseudoranges, which are computed from the time of flight of the RF signals from each GPS satellite to the GPS hardware. The RF signals travel 64 to 89 milliseconds from a satellite to the Earth's surface. Note that light travels 300 km/ms. So, in order to obtain an accurate position, the GPS hardware tracks time to the microsecond level. The millisecond part (NMS) and the sub-millisecond (subMS) parts of the propagation time are detected very differently. While NMS is decoded from the packet frames, the subMS propagation time is detected at the C/A code level using correlations.

The acquisition stage is run when the GPS hardware 232 starts up. The goal of the acquisition phase is to start receiving the data transmitted by the SVs visible to the GPS receiver by correctly locking to the GPS satellite frequency. Acquisition phase also measures the Code Phase values as a byproduct. To decode the data from a given satellite, three unknowns are estimated. Due to Doppler frequency shift and un-synchronized clocks between the GPS hardware 232 and the GPS satellites, the acquisition process searches over a space of possible frequencies and code phases.

Once the GPS satellite signals are acquired, the GPS hardware 232 enters a relatively inexpensive tracking stage, which keeps feedback loops to adjust phase locks and delay locks and maintain the code phases in the receiver in sync with those from the GPS satellites. In the continuous mode, the tracking loop runs every millisecond.

With correct tracking, the GPS hardware 232 can decode the packets sent by the SVs. In general, without assistance information, the GPS hardware 232 tends to decode SV ephemeris every 30 minutes (its valid time span) and time stamps every 6 seconds. Decoding is energy consuming since it runs tracking continuously for the packet duration in order to receive all the bits. With A-GPS, the mobile device's GPS hardware 232 is not required to decode ephemeris, but it must still decode HOW, at least in some implementations.

Given ephemeris and propagation delays obtained from code phase and HOW, the GPS hardware 232 performs location calculations using constraint optimization techniques, such as least square minimization. This is usually done on processor 224. With the received latitude, longitude, altitude, and precise time, the GPS hardware 232 uses a minimum of four SVs in view, with at least some location identification techniques.

A key for the GPS hardware 232 to lock to a GPS satellite and to estimate the code phases (i.e. subNMS) is to perform correlation analysis between receiving signals and C/A code templates, at least in some implementations. The GPS hardware can further proceed to decode the packets when the correlator gives strong output.

First, the obstruction-detection module 220 can determine if the given GPS satellite is visible to the GPS hardware 232. The presence of a given GPS satellite can be determined by detecting the presence of its C/A code in the received GPS signal. Second, although the GPS satellites' transmissions are centered on a 1.575 GHz carrier frequency, the signals from different GPS satellites received at the GPS hardware can deviate from this due to the Doppler frequency shift caused by the relative motion between the individual GPS satellites 210 and the mobile device 202. These Doppler shifts can be used to decode the data from a given GPS satellite. Third, since the satellite signal is encoded by a 1023 bit C/A code, the received signal can be decoded by multiplying it with the C/A code of the corresponding GPS satellite at the correct time instance (CDMA decodings). Although the C/A codes are well known, the exact timing of when the signals should be multiplied is unknown and it depends on the position of the user (e.g., mobile device). Since the C/A codes repeat every 1 ms this unknown fractional millisecond time represents the Code Phase of the corresponding satellite.

If the obstruction-detection module 220 has no knowledge of the current SV arrangement in the sky and the precise time, the obstruction-detection module can search through all possible C/A codes, Doppler frequency shifts, and/or code phases.

To be precise, assume s is 1 ms of raw GPS signal sampled by the GPS hardware 232 front end at 8 MHz. That is s is a vector of length 8×1,023=8,184. To test if satellite v is visible, the obstruction-detection module 220 can search in the frequency and code phase space using the C/A code, Cv corresponding to satellite v. To do so, the obstruction-detection module 220 can first adjust Cv by a possible Doppler frequency, and then circular-shift (meaning that the values that shift out from the end of Cv is inserted back to the front) the vector to obtain a new Cv(fi, k). Then, obstruction-detection module 220 can compute $$J_{i,k} = sT \times Cv(fi,k)$$

which is a measure of how correlated the raw signal is with respect to the frequency and shifted template.

Figure 4:
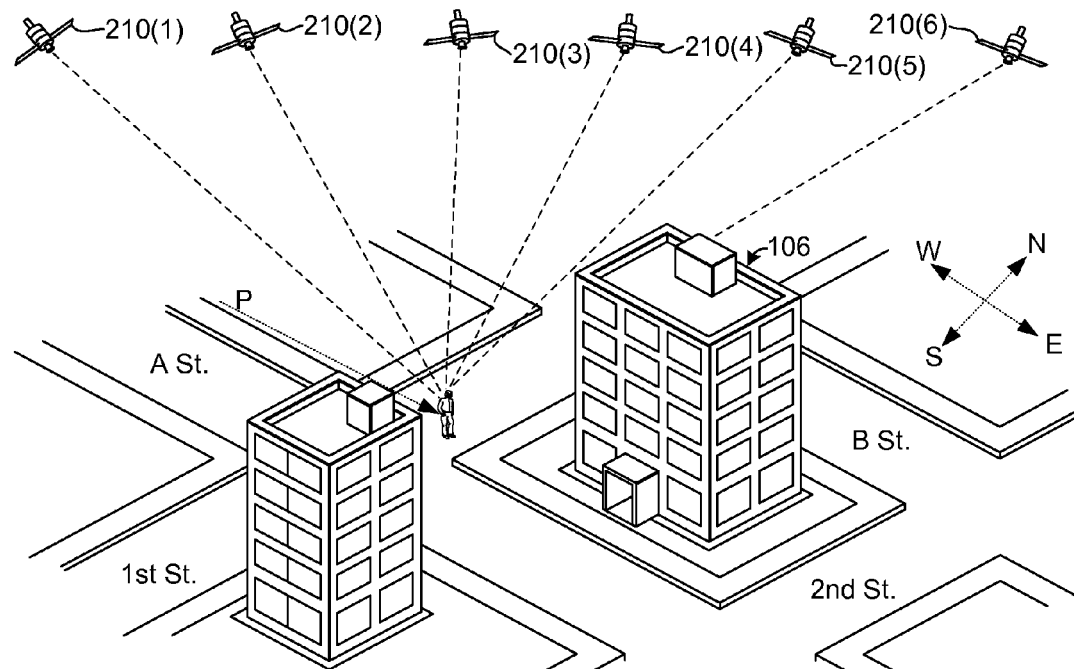

FIG. 4 shows a subsequent point where the user 104 has traveled East on A Street for a period of time until the mobile device once again attempts to receive signals from available (e.g., overhead) GPS satellites 210(1)-210(6) according to the default periodic setting. In this instance, the mobile device obtains signals from GPS satellites 210(1)-210(5), but the sixth satellite's signal is blocked by an obstruction (e.g., building 106) to such a degree that the signal quality falls below a quality threshold (e.g. dynamically defined threshold or predefined threshold introduced above) and is not utilized. However, the mobile device can accurately determine its location with the five unobstructed satellites.

The mobile device can also compare this location (illustrated in FIG. 4) to the previous location of FIG. 3 to determine that the user is traveling East on A Street along a given path. Further still, the mobile device can leverage the obstructed satellite to infer the presence of an obstruction and the relative direction and/or location of the obstruction. Recall that the ephemeris data indicates that six satellites are present and their location. In this case, the satellite that is obstructed is the satellite farthest to the North. The mobile device can infer that the obstruction is likely to the North of the user. Further, the mobile device can use this information about the relative location of the obstruction to further refine the accuracy of the user's location. For instance, an obstruction of a given geometric shape tends to be more likely to block satellite signals the closer the user is to the obstruction.

In the present scenario, the obstruction of satellite 210(6) by the building 106 makes it more likely that the user is on the same side of the street as the obstruction. From this information, the mobile device can determine that the user is more likely to be on the North side of A Street than the South side. Further still, the mobile device can utilize the comparison between the received GPS signals of FIG. 3 and the received GPS signals of FIG. 4 to make various predictions. For instance, the mobile device can use the comparison of the received signals of FIG. 3 to the received signals of FIG. 4 as an indication that the user is approaching the obstruction, since a previously available satellite (e.g., satellite 210(6)) is now unavailable and therefore is likely being obstructed.

Since the user is approaching the obstruction, the mobile device can predict that signals from additional GPS satellites 210 may be lost. As such, the mobile device can be controlled based upon this information. For instance, the mobile device may recognize that only five GPS satellites are unobstructed and as the user continues toward the obstruction that the number of GPS satellites may drop below the requisite four utilized for accurate location determination. As such, the mobile device may begin receiving satellite signals more frequently than the default periodic setting so that the accurate location data is obtained as long as possible (to potentially as far a point in the user's travels as possible). Further, the mobile phone may begin to activate the relative location mechanisms. These relative location mechanisms can determine movement relative to the last accurate GPS based location. For instance, the relative location mechanisms can determine if the user is continuing to travel in a straight line since the last accurate GPS based location, has stopped, has turned, etc.

In order to determine the boundary of the penumbral region, some of the implementations can leverage the first stages of GPS signal acquisition to estimate whether the mobile device is about to lose GPS signals. In particular, some of the techniques can rely on the quality of the correlation results computed from various GPS satellites.

Recall that the mobile device, on a continual and/or periodic basis, can receive the GPS satellite signals and can perform the signal acquisition and phase determination at various points along this path. At individual points of measurement various quantities can be examined:

The number of satellites visible to the device, Ns

The signal strength of receiving signals Rs

The quality of the correlation peak for each satellite's received signal, Qs.

As shown in the figure, typically in areas fully lit by the GPS system Ns>=Nmin satellites will be visible. At these places the GPS capability alone will be able to provide a position fix.

Eventually as the trajectory of the mobile device moves along the path into the dead zone (e.g., the penumbral and umbral regions), at some point Xu, the number of visible satellites could decrease to a lower number (Ns<Nmin)

which will be inadequate for determining a position fix. At this point, the mobile device is in the umbral region of the dead zone. Eventually as the mobile device is carried deeper into the dead zone the number of visible satellites could fall to zero (Ns=0).

However even when Ns>=Nmin, the quality of the signal received from the satellites might be degraded by various factors. Thus the quality/accuracy of the position fix will be degraded as well. Some of the described techniques rely on examining the nature of the correlation peak obtained for each satellite signal. As noted above, each GPS signal can be compared to a threshold to determine whether the corresponding GPS satellite is being blocked. Some implementations can employ a factor Qs to describe the fidelity of the signal peak. For example, Qs can be computed by the ratio between the highest peak and the second highest value near the peak. Qs can represent how "sharp" the peak is. The sharper the peak, the better the signal tends to correlate with the C/A code template.

When the mobile device 202 enters the penumbral zone, depending on the angles of the visible satellites and near ground obstructions, the signal is weaker and the peak widens and smears/flattens becoming less distinct. Therefore along points where Ns>=Nmin the fidelity factor can be compared to a predetermined threshold value Qmin. Those points where less than Nmin satellites show a sharp peak (Qs>Qmin) are considered to be inside the penumbra of the dead zone. This technique can identify a point Xp which identifies the approximate boundary of the penumbra of the dead zone.

Note that to compute the correlation quality of visible satellite signals, the mobile device does not need to fully decode the satellite packets as in the location calculation mode—a technology known as Low-Energy Assisted Positioning (LEAP). Thus, it can be achieved in an energy efficient manner. For example, in one case, the mobile device's receiver only needs to be turned on for 2 ms to collect enough data to perform correlation analysis.

Because LEAP is energy efficient, a close approximation of the position of Xp can be obtained by dense measurements in the trajectory just outside the penumbra. The accuracy of this position determination can be enhanced by using a high frequency of LEAP measurements in this part of the trajectory. The frequency of LEAP measurements can be sustained at a high level without adverse impact on the device battery since the LEAP technique does not require actually calculating these positions in real time.

As mentioned above, some implementations can employ crowd-sourcing readings. The crowd-sourcing readings of Ns and {Qs} at the various points along the device's trajectories can be leveraged to approximately identify the points Xp for these trajectories. A growing collection of data can then be used to progressively improve the outline of the external edge of the penumbral dead zone overlaid on maps. The details of this process depend on the ultimate use of the dead zone maps. For instance, one application of crowd-sourcing beacon observations for the purpose of indoor positioning can utilize a union of all areas in which unacceptable GPS positioning will result.

The technique determines the position of each of the observations described above. In the portions where Ns>=Nmin satellite signals have Qs>Qmin, recording the phase deltas together with the time of the observation will suffice to carry out an offline computation of the corresponding position in a crowd-sourcing service as described elsewhere in connection with the LEAP methodology.

Figure 5:
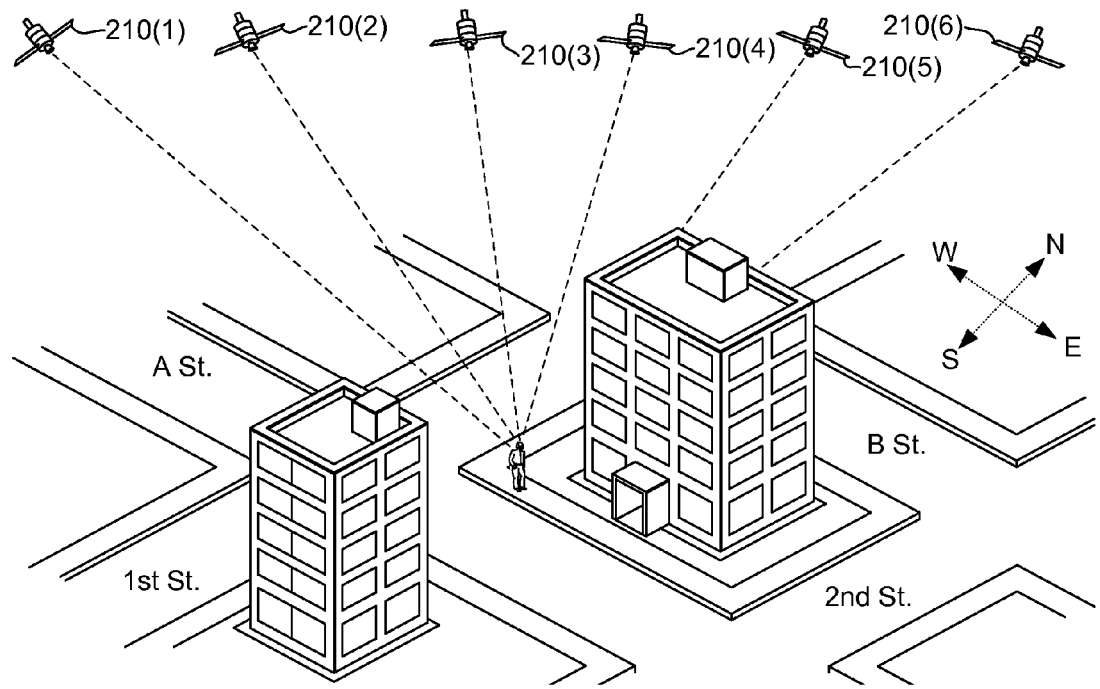

FIG. 5 shows a subsequent scenario where the user has continued to travel East on A Street. As mentioned above in the discussion relative to FIGS. 3-4, the mobile device can frequently and/or continuously attempt to receive signals from the GPS satellites 210. In FIG. 5, the obstruction (building 106) is now blocking signals from the two northernmost satellites (210(5) and 210(6). The mobile device can interpret this progression from no blocked satellites, to one blocked satellite, to two blocked satellites as a further indication that the user is approaching the obstruction and thereby potentially the umbral region. The mobile device can further increase the confidence that the user is on the North side of A Street rather than the South side since both of the blocked GPS satellites are on that (e.g., North) side.

As mentioned above, based on the GPS signals received (and/or blocked) in FIGS. 4-5, the mobile device can be frequently and/or continuously attempting to receive GPS signals from the GPS satellites to accurately determine the user's location. Recall that this region where the obstruction is blocking some satellites' GPS signals but adequate numbers of GPS signals can be obtained to accurately determine the user's location can be termed the "penumbral region".

As noted above, the mobile device can be controlled to account for entering the penumbral region, such as by attempting to receive satellite signals more frequently and/or by activating other location mechanisms, such as relative location mechanisms. Due to this changed functionality, in FIG. 5 the mobile device can obtain an accurate GPS based location at basically the last possible location before the obstruction blocks too many of the GPS satellites.

Figure 6:
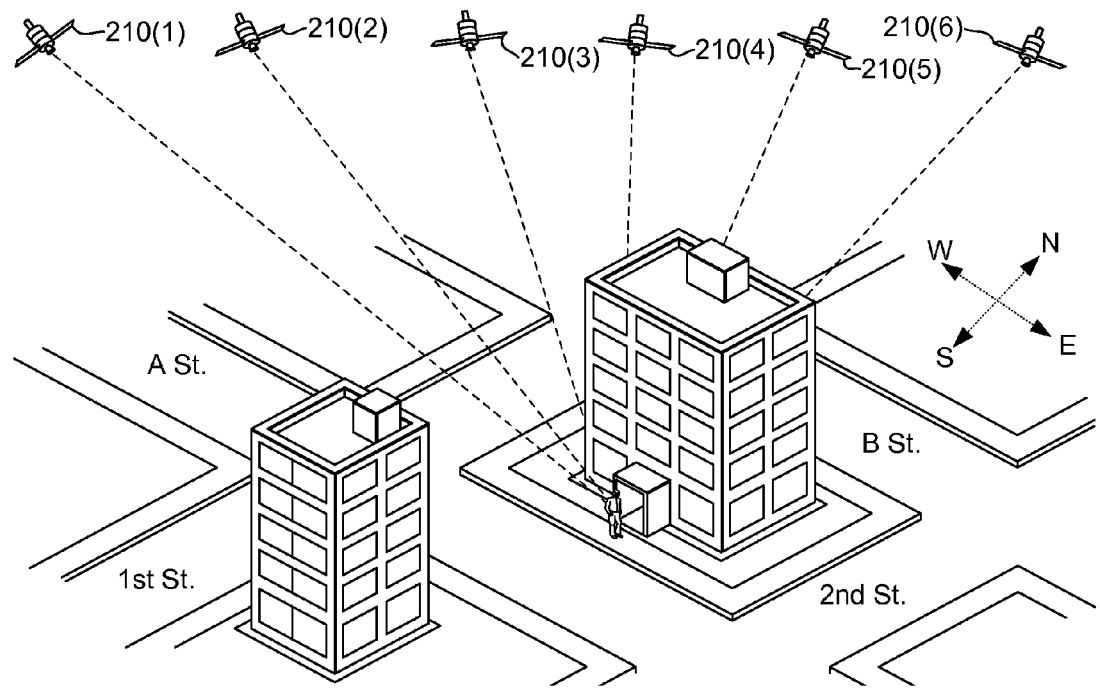

FIG. 6 shows a subsequent instance where the user has entered a region where so many GPS satellites are blocked that accurately determining the user's location through GPS techniques is not readily possible. As mentioned above relative to FIG. 1, this region can be termed the "umbral region". In this case, the mobile device can make further predictions for controlling the mobile device. The predictions can be based on the received versus expected GPS signals described relative to FIGS. 1-4 and/or on information from the relative location mechanisms. For example, the mobile device may be able to access map data that shows the size of the obstruction. Then for example, once the user enters the umbral region, the device can predict when the user will likely clear the umbral region. For instance, the relative location mechanisms can indicate that the user has continued to move in a straight line since entering the umbral region. With this information and information about the user's speed and the size of the obstruction, the mobile device can predict when the user may clear the umbral region.

The mobile device may reduce power consumption by limiting sensing for GPS signals until the predicted emergence from the umbral region. This prediction can be revised upon receipt of additional information. For instance, if the relative location mechanisms indicate that the user has changed direction and has turned toward the building, the mobile computing device may predict that the user is entering the obstruction. The mobile device may then take a different course of action, such as attempting to detect wireless access points which may be located in the building.

One technique for determining the boundary of the umbral region can be based on use of relative location dead reckoning. For instance, such relative location dead reckoning can be achieved via cell hardware 234, Wi-Fi hardware 236, gyroscope 238, accelerometer 240, and magnetometer 242 and/or other relative location mechanisms.

First as the user proceeds along the trajectory P into the interior of the dead zone from the point Xp, the number of satellites visible is initially Ns>=Nmin, however the value of Q<Qs for one or more of these satellites. Finally at the point Xu the number of satellites visible drops below Nmin and this identifies the edge of the umbra. Along the trajectory from Xp towards Xu the relative position can be determined starting with the location of Xu by using MEMS-based dead reckoning.

In this fashion the point Xu is identified and its location calculated using the location of Xp and the incremental location changes determined via the dead reckoning technique. Crowd-sourcing these various points X can progressively improve the approximate outline of the external edge of the umbral region of the dead zone and overlay it on maps.

To summarize, GPS and other satellite based navigation systems use time-of-flight of signal from multiple satellites in orbit to triangulate a location on the earth. In open spaces, many satellites may be visible but at least four are generally required with current technologies. In obstructed spaces like on sidewalks next to buildings, fewer satellites may be visible. Ephemeris information is also available that tells the expected position of the each satellite in the sky. If a satellite is potentially visible based on its position in the sky, but hidden due to occluding buildings, then the present implementations can determine the side of the building or street that one is on based on which satellites are visible, as long as at least four satellites are visible for approximate localization.

Some implementations can employ two techniques to further improve the inference accuracy, in particular to combat the multipath effects due to high rises in urban areas. First, these implementations can examine the changes in the set of visible satellites. For example, the disappearance of several satellites that are supposed to be visible on one side of the street can suggest that the mobile device has moved to the other side (e.g., the user crossed the street). Second, the implementation can iteratively improve the side inference by feeding the side information to a map service and/or a localization service. The side information tends to allow a higher resolution in location estimation, which can be subsequently used to derive a new side inference.

When Wi-Fi AP information is available for buildings on the street sides, some implementations can further leverage the APs visible to mobile devices at different sides of the street to improve the side inference accuracy. The set of visible APs can be used in a similar way as the set of visible satellites.

Stated another way, solutions can be implemented with or without Wi-Fi APs. Without Wi-Fi AP information, some solutions can rely on the GPS signals: when the GPS signals are acquired or lost and the ephemeral information of the corresponding GPS satellites, which is publicly available. Once the localization service can provide an estimation of the current location to the street level, the solution can construct the structure of the urban canyon for that street section. The construction can be assisted by the information about the buildings on the street from a map service. In some implementations, the construction can also simply assume there are relatively high buildings on both sides of the street, which is true for most urban areas. Using the ephemeral information of GPS satellites at the time, the solution can derive the set of satellites that are most likely to be visible at one side of the street at the estimated location and another set of satellites for the other side of the street. By comparing these two sets to the set of satellites whose signals are actually acquired at the same time, the solution can determine which side of the street the device is more likely to be on.

Further Detailed Examples

This discussion provides detailed examples for detecting obstruction caused penumbral and umbral regions. These techniques can be performed by obstruction-detection module 220 (FIG. 2) or other components. Detection of one or both of these regions can allow predictions to be made regarding the mobile device, such as by prediction module 222 (FIG. 2). The mobile device can then be controlled based upon the detected regions and/or the predictions.

Figure 7:
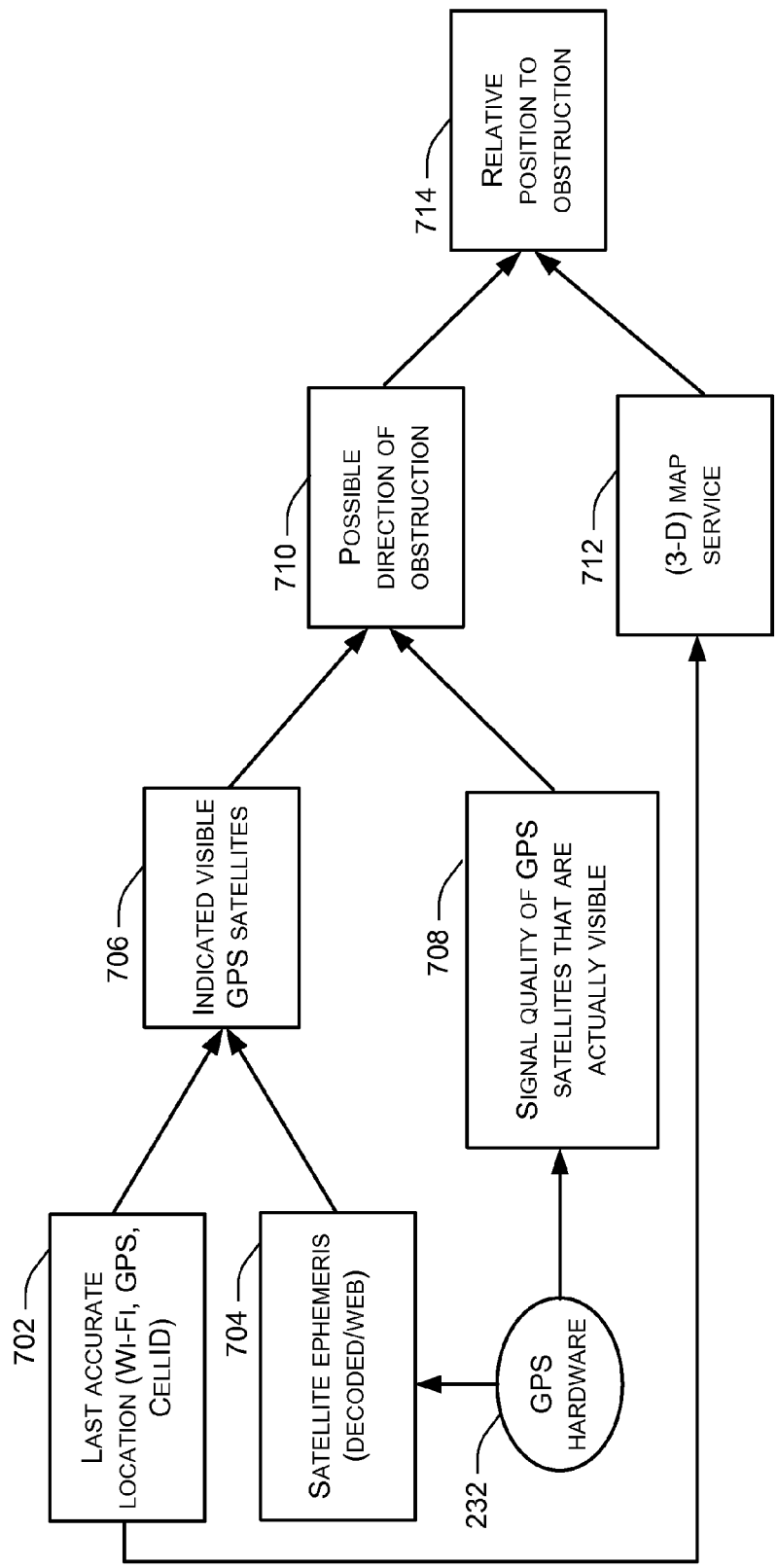
FIGS. 7-9 are flowcharts of examples of mobile device location methods in accordance with some implementations of the present concepts.

FIG. 7 illustrates a flowchart of a method or technique 700 that is consistent with at least some implementations of the present concepts. Note that method 700 can be an iterative method in some cases, as such while particular blocks are discussed first, no fixed order is intended. This particular method includes seven blocks 702, 704, 706, 708, 710, 712, and 714 and GPS hardware 232.

At block 702, the method can obtain last accurate location information relating to a mobile device. In many implementations, the last accurate location information is obtained when adequate GPS signals are received from four or more GPS satellites. Alternatively, the last accurate location information may use a combination of GPS techniques and Wi-Fi, Cell ID techniques, among others.

At block 704, the method can obtain GPS satellite ephemeris data from GPS hardware 232 and/or from NASA over the Internet.

At block 706, the method can identify the indicated visible GPS satellites based upon input received from blocks 702 and 704.

At block 708, the GPS signals from GPS hardware 232 can be evaluated to determine which GPS satellites are actually visible (e.g., unobstructed). In one case, received GPS signals can be compared to a predefined threshold to determine whether or not the GPS signals are obstructed.

At block 710, input from blocks 706 and 708 can be utilized to determine a possible direction of an obstruction. For instance, the expected GPS signal can be compared to the received GPS signals. The location of the GPS satellites corresponding to any missing or degraded GPS signals can be determined from the ephemeris data.

At block 712, the output of block 702 can be applied to a 3-D map service to identify any obstructions proximate to the last accurate location.

At block 714, the blocks 710 and 712 can provide input to determine a location of an obstruction relative to the mobile device. The mobile device can then be controlled based upon the relative location of the obstruction to achieve various goals, such as conserving resources on the mobile device and/or providing useful location information to the user.

Figure 8:
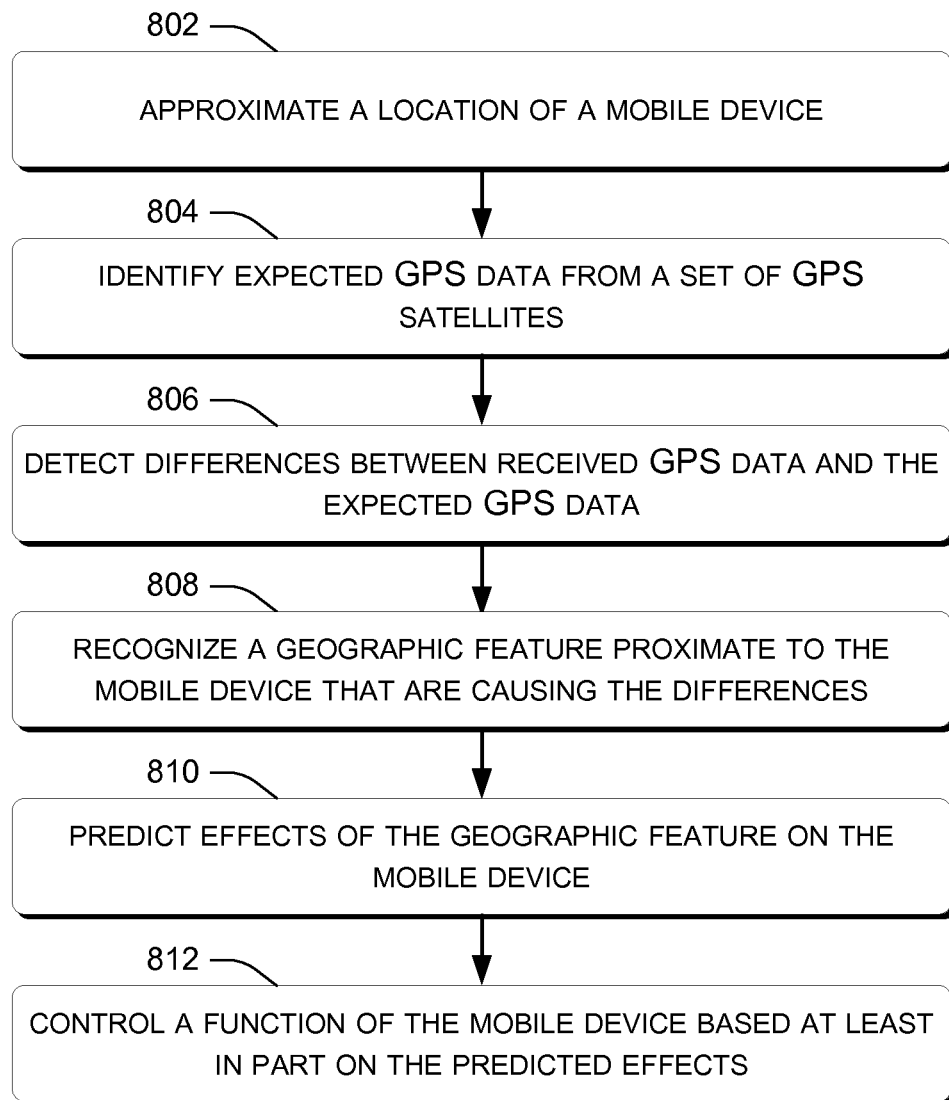

FIG. 8 illustrates a flowchart of a method or technique 800 that is consistent with at least some implementations of the present concepts.

At block 802, the method can approximate a location of a mobile device based upon a last accurate GPS reading.

At block 804, the method can identify expected GPS data from a set of GPS satellites that should be in line of sight to the mobile device based upon the last accurate GPS reading and ephemeris information. For example, the set of overhead satellites can be determined based upon the location of the mobile device and ephemeris data that specifies which GPS satellites are above that location at that time. The ephemeris location can be obtained from the GPS satellites themselves or from a database, such as may be maintained by NASA or another entity.

At block 806, the method can detect differences between received GPS data and the expected GPS data. In some cases received GPS data can be compared to a predefined threshold that represents a percentage of the expected GPS data (e.g., signal strength). For example, the threshold may be defined at 60 percent (for instance) of the expected signal strength such that a received GPS signal that falls below the threshold is considered blocked. In some cases the detected differences can be used as indicators that the mobile device is in a penumbral/umbral region created by the geographic feature. Alternatively or additional to GPS signal strength, some implementations can utilize signal shape as an indicator to the presence of an obstruction. For example, in some instances, the GPS signals can bounce off of one or more obstructions proximate to the mobile device and thereby the received GPS signals may include several small peaks rather than a single large peak. Thus, the shape of the received GPS signals can also be indicative of the presence of obstructions. In summary, received GPS signals (or the lack thereof) can be indicative of the presence of an obstruction(s). Deviations in the number of received GPS signals and/or the strength and/or shape of received GPS signals from one or more of the available GPS satellites can be indicative of the presence of an obstruction.

At block 808, the method can recognize a geographic feature (e.g., obstruction) proximate to the mobile device that is causing the differences. As mentioned above, the location of the geographic feature relative to the mobile device can be determined by which GPS satellites are blocked and which are not blocked. Alternatively or additionally resources, such as 3-D maps can be accessed which indicate the presence of geographic features proximate to the location of the mobile device.

At block 810, the method can predict effects of the geographic feature on the mobile device at a subsequent time. The prediction can be based upon the path of the mobile device and/or deviation from the path. A deviation can be a change in speed, a change in direction, going from outside to inside a building, etc. The prediction can also consider movement of the obstructed satellite. For instance, the satellite can be moving 'behind' the obstruction or 'out from behind' the structure. In the latter case, the received GPS signal may get stronger even if the mobile device remains stationary.

At block 812, the method can control a function of the mobile device based at least in part on the predicted effects. For example, relative location mechanisms can be activated. Alternatively or additionally, sensing for additional GPS signals can be obtained more frequently or delayed compared to a predefined default setting. For instance, the mobile device can attempt to obtain further GPS signals prior to entering the umbral region. Conversely, once in the umbral region, further attempts may be delayed until a predicted emergence of the mobile device from the umbral region.

Figure 9:
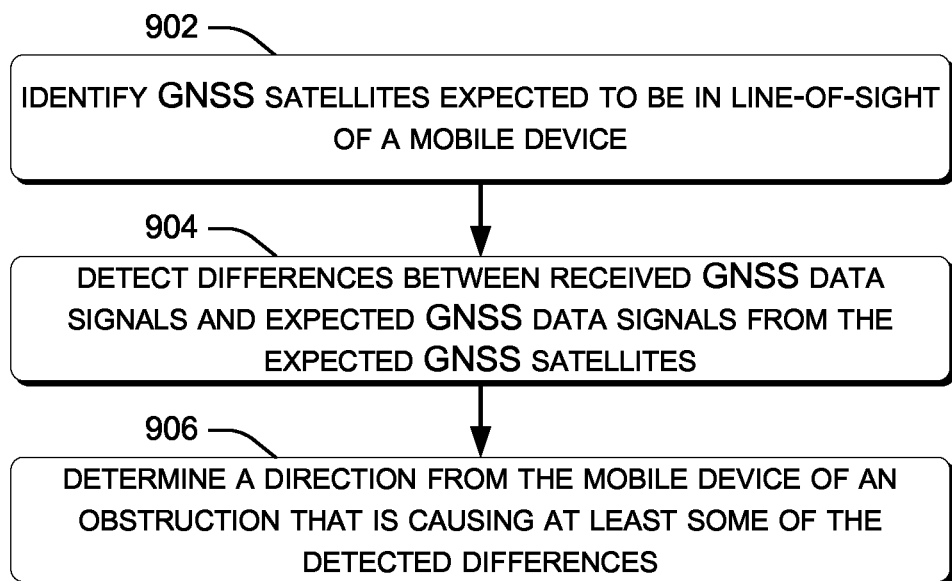

FIG. 9 illustrates a flowchart of another method or technique 900 that is consistent with at least some implementations of the present concepts.

At block 902, the method can identify GNSS satellites expected to be in line-of-sight of a mobile device. In some cases, the identifying can be achieved by accessing a database of ephemeris information. In other cases, the identifying can be achieved by obtaining the ephemeris information directly from the GNSS satellites.

At block 904, the method can detect differences between received GNSS data signals and expected GNSS data signals from the expected GNSS satellites. In some cases, the differences are detected using signal strength of the GNSS data received from an individual GNSS satellite. In an instance where the signal strength of the GNSS data received from the individual GNSS satellite falls below a predefined threshold, the individual GNSS satellite can be considered to be blocked by the obstruction. This process can be repeated for each available GNSS satellite as indicated by the ephemeris information.

At block 906, the method can determine a direction from the mobile device of an obstruction that is causing at least some of the detected differences. The direction of the obstruction (and/or other information about the obstruction) can be used to predict future effects of the obstruction on the mobile device. The functionality of the mobile device can then be controlled at least in part based upon the predicted future effects. For instance, the mobile device can track its movement from the last accurate GNSS-based location. The mobile device can then take appropriate actions, such as accessing various Wi-Fi networks, cell networks, etc.

The order in which the above methods are described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method (e.g., computer-implemented method). In one case, the method is stored on a computer-readable storage media as a set of instructions such that execution by a computing device causes the computing device to perform the method.

CONCLUSION

Although techniques, methods, devices, systems, etc., pertaining to location-aware implementations are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method comprising:
    approximating a location of a mobile device based at least upon a last accurate global navigation satellite system (GNSS) reading associated with actual GNSS data received by the mobile device, the actual GNSS data being sensed according to a predetermined default setting;
    identifying expected GNSS data from a set of GNSS satellites that should be in line of sight to the mobile device based at least upon the last accurate GNSS reading and ephemeris information;
    detecting differences between the expected GNSS data and the actual GNSS data received by the mobile device;
    distinguishing between at least one unobstructed GNSS satellite and at least one obstructed GNSS satellite using the differences, the at least one unobstructed GNSS satellite having corresponding actual GNSS data that matches the expected GNSS data and the at least one obstructed GNSS satellite having associated actual GNSS data that does not match the expected GNSS data;

recognizing that a geographic feature is proximate to the mobile device and that the geographic feature is located in the direction of the at least one obstructed GNSS satellite;
predicting effects of the geographic feature on the mobile device at a subsequent time; and
sensing the actual GNSS data more frequently than the predetermined default setting based at least in part on the predicted effects of the geographic feature.

2. The method of claim 1, wherein the identifying comprises obtaining the ephemeris information from the set of GNSS satellites.

3. The method of claim 1, further comprising:
based at least on the differences between the expected GNSS data and the actual GNSS data, determining that the mobile device is in a penumbral region created by the geographic feature.

4. The method of claim 1, wherein the detecting comprises comparing signal strengths of the actual GNSS data to a signal strength threshold, the corresponding actual GNSS data for the at least one unobstructed GNSS satellite exceeding the signal strength threshold and the associated actual GNSS data for at least one obstructed GNSS satellite falling below the signal strength threshold.

5. The method of claim 1, further comprising:
determining that the mobile device is on a particular side of a street that is relatively closer to the geographic feature than another side of the street.

6. The method of claim 1, wherein the predicting comprises:
predicting whether the mobile device will enter an umbral region created by the geographic feature.

7. The method of claim 1, wherein the predicting comprises:
determining whether the mobile device is moving toward the geographic feature, away from the geographic feature, or parallel to the geographic feature.

8. The method of claim 7, further comprising:
activating dead reckoning functionality on the mobile device based at least in part on the predicted effects of the geographic feature.

9. The method of claim 7, wherein the predicting comprises:
in an instance when the mobile device is moving toward the geographic feature, predicting a time when the mobile device will clear the geographic feature and be able to accurately determine a subsequent location of the mobile device.

10. The method of claim 9, further comprising:
determining a size and relative location of the geographic feature and a direction and velocity of the mobile device,
wherein the time is predicted based at least on the size, the relative location, the direction, and the velocity.

11. The method of claim 1, further comprising:
in at least one instance, determining a path of the mobile device from the location.

12. The method of claim 1, performed entirely by the mobile device.

13. A mobile device comprising:
a processor; and
hardware storage storing instructions which, when executed by the processor, configure the processor to:
approximate a location of the mobile device based at least upon a last accurate global navigation satellite system (GNSS) reading associated with actual GNSS data received by the mobile device according to a periodic setting;
identify expected GNSS data from a set of GNSS satellites that are expected to be in line of sight to the mobile device based at least upon the last accurate GNSS reading;
detect differences between the expected GNSS data and the actual GNSS data received by the mobile device to identify at least one obstructed GNSS satellite having associated actual GNSS data that does not match the expected GNSS data;
recognize that a geographic feature is proximate to the mobile device and that the geographic feature is located in the direction of the at least one obstructed GNSS satellite; and
responsive to recognizing that the geographic feature is proximate to the mobile device, receive the actual GNSS data more frequently than the periodic setting.

14. The mobile device of claim 13, wherein the instructions, when executed by the processor, configure the processor to:
determine a refined location of the mobile device that is relatively closer to the geographic feature than the location approximated using the last accurate GNSS reading.

15. The mobile device of claim 14, wherein the instructions, when executed by the processor, configure the processor to:
responsive to recognizing that the at least one obstructed GNSS satellite is to the North of the mobile device, determine the refined location such that the refined location is to the North of the location approximated using the last accurate GNSS reading.

16. The mobile device of claim 13, wherein the instructions, when executed by the processor, configure the processor to:
responsive to recognizing that the geographic feature is proximate to the mobile device, control the mobile device by activating a relative location mechanism on the mobile device.

17. The mobile device of claim 16, wherein the relative location mechanism comprises a dead reckoning mechanism.

18. A system comprising:
a processor; and
hardware storage storing instructions which, when executed by the processor, configure the processor to:
approximate a location of a mobile device based at least upon a last accurate global navigation satellite system (GNSS) reading associated with actual GNSS data received by the mobile device according to a predetermined setting;
identify expected GNSS data from a set of GNSS satellites that should be in line of sight to the mobile device based at least upon the last accurate GNSS reading;
detect differences between the expected GNSS data and the actual GNSS data received by the mobile device;
based at least on the detected differences between the expected GNSS data and the actual GNSS data, determine that there is at least one obstructed GNSS satellite at the location of the mobile device; and
responsive to determining that there is at least one obstructed GNSS satellite at the location of the mobile device, cause the mobile device to receive the actual GNSS data more frequently than the predetermined setting.

19. The system of claim 18, embodied as a computer located remotely from the mobile device.

20. The system of claim 18, embodied as the mobile device.

\* \* \* \* \*